United States Patent
Tsujimura et al.

(10) Patent No.: US 7,895,824 B2
(45) Date of Patent: *Mar. 1, 2011

(54) DIAGNOSIS APPARATUS FOR SECONDARY AIR SUPPLY APPARATUS

(75) Inventors: Tomohiro Tsujimura, Obu (JP); Shujiro Morinaga, Takahama (JP); Satoshi Kodo, Nagoya (JP)

(73) Assignee: Denso Corporation, Kariya (JP)

( * ) Notice: Subject to any disclaimer, the term of this patent is extended or adjusted under 35 U.S.C. 154(b) by 225 days.

This patent is subject to a terminal disclaimer.

(21) Appl. No.: 12/081,973

(22) Filed: Apr. 24, 2008

(65) Prior Publication Data

US 2008/0202223 A1    Aug. 28, 2008

Related U.S. Application Data

(62) Division of application No. 11/396,961, filed on Apr. 4, 2006, now Pat. No. 7,448,202.

(30) Foreign Application Priority Data

| Apr. 4, 2005 | (JP) | ............................. | 2005-107045 |
| Apr. 28, 2005 | (JP) | ............................. | 2005-131224 |
| Apr. 28, 2005 | (JP) | ............................. | 2005-131518 |

(51) Int. Cl.
*F01N 3/00* (2006.01)
(52) U.S. Cl. ............................. 60/277; 60/285; 60/289; 60/291; 60/292; 60/293
(58) Field of Classification Search .................... 60/274, 60/276, 277, 285, 289, 90, 291, 292, 293, 60/307, 290

See application file for complete search history.

(56) References Cited

U.S. PATENT DOCUMENTS 5,119,631 A    6/1992    Kayanuma et al.

(Continued)

FOREIGN PATENT DOCUMENTS

JP    7-119451    5/1995

(Continued)

OTHER PUBLICATIONS

Office Action mailed Dec. 1, 2009 issued in corresponding Japanese Application No. 2005-131224 with an at least partial English-language translation thereof.

(Continued)

*Primary Examiner*—Binh Q. Tran
(74) *Attorney, Agent, or Firm*—Nixon & Vanderhye P.C.

(57) ABSTRACT

A secondary air supply system includes a supply passage, a valve, and a detecting unit. Secondary air is supplied to the upstream of a purification apparatus in an exhaust passage of an engine through the supply passage. The valve communicates and blocks the supply passage to be in open and close conditions. The detecting unit detects a detection object of secondary air in the upstream of the valve in the supply passage. A diagnosis apparatus for the secondary air supply system includes a diagnosis unit that obtains a detection result of the detecting unit in each of the open and close conditions of the valve for evaluating an abnormity of the secondary air supply system in accordance with the detection result. The diagnosis apparatus includes a reliability maintaining unit that determines the diagnosis operation of the diagnosis unit to be valid when the detecting operations in the open and close conditions are continuously performed.

16 Claims, 16 Drawing Sheets

U.S. PATENT DOCUMENTS

| | | | | |
|---|---|---|---|---|
| 5,140,810 | A | 8/1992 | Kuroda | |
| 5,381,658 | A | 1/1995 | Meguro | |
| 5,560,199 | A | 10/1996 | Agustin et al. | |
| 5,666,804 | A * | 9/1997 | Sekiya et al. | 60/284 |
| 5,746,049 | A * | 5/1998 | Cullen et al. | 60/274 |
| 6,393,833 | B2 * | 5/2002 | Mizoguchi | 60/289 |
| 6,904,792 | B2 | 6/2005 | Wakahara | |
| 6,918,245 | B2 | 7/2005 | Hirooka et al. | |
| 6,945,035 | B2 | 9/2005 | Hirooka et al. | |
| 7,140,177 | B2 * | 11/2006 | Koyama et al. | 60/289 |
| 7,293,406 | B2 * | 11/2007 | Lewis et al. | 60/284 |
| 7,448,202 | B2 * | 11/2008 | Tsujimura et al. | 60/277 |
| 7,543,444 | B2 * | 6/2009 | Oi et al. | 60/289 |
| 2004/0148926 | A1 | 8/2004 | Morinaga et al. | |

FOREIGN PATENT DOCUMENTS

| | | |
|---|---|---|
| JP | 07-119451 | 5/1995 |
| JP | 2000-170530 | 6/2000 |
| JP | 2004-011600 | 1/2004 |
| JP | 2004-293426 | 10/2004 |

OTHER PUBLICATIONS

Office Action dated Dec. 22, 2009 issued in corresponding Japanese Application No. 2005-131518 with an at least partial English language translation thereof.

* cited by examiner

DIAGNOSIS APPARATUS FOR SECONDARY AIR SUPPLY APPARATUS

CROSS REFERENCE TO RELATED APPLICATIONS

This application is a divisional of U.S. application Ser. No. 11/396,961, filed Apr. 4, 2006, (now U.S. Pat. No. 7,448,202) which is based on Japanese Patent Application Nos. 2005-107045 filed on Apr. 4, 2005, No. 2005-131244 filed on Apr. 28, 2005, and No. 2005-131518 filed on Apr. 28, 2005. The contents of all of the above-noted applications are incorporated herein by reference.

FIELD OF THE INVENTION

The present invention relates to a diagnosis apparatus for a secondary air supply system for an internal combustion engine.

BACKGROUND OF THE INVENTION

According to a diagnosis apparatus disclosed in U.S. Pat. No. 6,918,245 B2 (JP-A-2004-11585), a valve is operated to communicate and block a secondary air supply passage when an air pump is operated to supply secondary air into an exhaust passage through the secondary air supply passage. In this diagnosis apparatus, differential pressure between the upstream of the valve and the downstream of the valve in the secondary air supply system is detected, so that it is evaluated whether an abnormity arises in the secondary air supply system, in accordance with the differential pressure.

Pressure in the secondary air supply apparatus changes due to variation in the atmospheric pressure. In addition, an amount of secondary air supplied from the air pump changes due to variation in voltage of a battery, which supplies electricity to the air pump. Furthermore, when a load applied to the air pump becomes high, temperature of the air pump increases. In this case, capacity of the air pump decreases, and the flow amount of secondary air decreases. Load applied to the air pump is increased mainly due to increase in exhaust pressure, which is apt to be increased when the vehicle is driven. Accordingly, when the diagnosis operation is performed in a driving condition of the vehicle, increase in exhaust pressure may exert influence to the capacity of the air pump. Furthermore, when the vehicle has a charging device such as a turbocharger, exhaust pressure is apt to be further increased, consequently, the capacity of the air pump is apt to further vary.

For example, pressure is detected in the diagnosis operation, in which the valve is opened, on a valve open timing. Pressure is also detected in the diagnosis operation, in which the valve is closed, on a valve close timing. When it takes a long period between the valve open timing and the valve close timing, pressure detected in the diagnosis operation may be fluctuated in this period. Specifically, the pressure detected in the diagnosis operation may be fluctuated due to variation in parameters, which indirectly exert influence to the diagnosis operation, such as the atmospheric pressure, temperature of the air pump, exhaust pressure, voltage of the battery, and the like. As a result, accuracy of the diagnosis operation may be degraded.

According to JP-A-7-119451, a diagnosis apparatus changes a threshold for evaluating an abnormity in a secondary air supply system, in accordance with an amount of intake air, or the like. When the amount of intake air changes, an amount of secondary air supplied to the exhaust pipe changes. In this operation, the diagnosis apparatus is capable of properly setting the threshold, so that accuracy of the detecting operation can be enhanced.

However, as temperature of an air pump in, the secondary air supply system increases, the capacity of the air pump decreases. When the temperature of the air pump becomes high, the capacity of the air pump decreases. Consequently, the threshold may not properly set by the diagnosis apparatus.

In addition, as load applied to the air pump becomes high, the temperature of the air pump increases. The load applied to the air pump increases mainly due to increase in exhaust pressure. When the diagnosis operation is performed in a condition where the vehicle moves, the exhaust pressure is apt to increase. Consequently, the capacity of the air pump is apt to fluctuate. Furthermore, when the vehicle has a charging device, the exhaust pressure is apt to further increase. Accordingly, the capacity of the air pump is apt to further fluctuate. Variation in temperature of the air pump exerts an unignorable influence to the diagnosis operation.

In general, an exhaust gas purifying apparatus such as a catalyst system is provided to an intake pipe of an internal combustion engine for purifying exhaust gas. Secondary air is supplied to upstream of the purifying apparatus in order to enhance efficiency of the purifying operation of the purifying apparatus. Specifically, a secondary air supply apparatus is provided with a secondary air pipe, an air pump, and a valve. The secondary air pipe connects with the engine. The air pump and the valve are provided in the secondary air pipe. The air pump is operated, and the valve is opened when the engine is started, for example, so that secondary air is supplied into an exhaust pipe through the secondary air pipe.

However, efficiency of purifying exhaust gas may decrease when one of the air pump and the valve cause a disorder in the secondary air supply apparatus. In this condition, engine emission may increase. According to U.S. Pat. No. 6,945,035 B2 (JP-A-2003-201834), when an abnormality is found in a failure diagnosis under a cold environment, and the abnormality is conceived to be caused due to freeze arising in a secondary air supply system, another failure diagnosis is performed after warming up. In this operation, it can be evaluated whether the abnormality is temporally caused due to the freeze arising in the secondary air supply system. In U.S. Pat. No. 6,945,035 B2, the following method is disclosed for evaluating the freeze arising in the secondary air supply system. That is, a valve is opened, and an air pump is operated when an engine is started, so that secondary air is supplied into an exhaust pipe through a secondary air pipe. Subsequently, pressure in the secondary air pipe is detected using a pressure sensor, so that it is evaluated whether components such as the air pump and the valve of the secondary air supply apparatus is frozen in accordance with the detection signal of the pressure sensor.

However, in this operation, the detection signal of the pressure sensor needs to be monitored while secondary air is supplied during the evaluation of the freezing condition. Accordingly, the evaluation of the freezing condition may take long. In addition, the air pump may be operated in a condition where the air passage is blocked. In this operation, excessive load may be applied to the air pump, consequently, the air pump may cause a disorder.

SUMMARY OF THE INVENTION

In view of the foregoing and other problems, it is an object of the present invention to produce a diagnosis apparatus for a secondary air supply system, the diagnosis apparatus being capable of performing a diagnosis operation of the secondary air supply system in accordance with detection results related to secondary air in both conditions, in which a valve is opened and closed. It is another object of the present invention to produce a diagnosis apparatus for a secondary air supply system, the diagnosis apparatus being capable of restricting an accuracy of a diagnosis operation form being degraded. It is another object of the present invention to produce a diagnosis apparatus for a secondary air supply apparatus, the diagnosis apparatus being capable of evaluating a frozen condition of the secondary air supply apparatus in engine start for protecting the secondary air supply apparatus.

According to one aspect of the present invention, a diagnosis apparatus for a secondary air supply system for an internal combustion engine has at least one exhaust passage, which connects with an exhaust gas purification apparatus. The secondary air supply system includes at least one secondary air supply passage, at least one valve, and a detecting unit. Secondary air is supplied to an upstream of an exhaust gas purification apparatus, in at least one exhaust passage of the internal combustion engine, through the at least one secondary air supply passage. The at least one valve is adapted to communicating the secondary air supply passage to be in an open condition, and is adapted to blocking the secondary air supply passage to be in a close condition. The detecting unit is adapted to detecting a detection object of secondary air in an upstream of the valve in the secondary air supply passage. The diagnosis apparatus includes a diagnosis unit and a reliability maintaining unit. The diagnosis unit is adapted to obtaining a detection result of the detecting unit in each of the open condition of the least one valve and the close condition of the least one valve. The diagnosis unit is adapted to evaluating an abnormity of the secondary air supply system in accordance with the detection result. The reliability maintaining unit is adapted to determining the diagnosis operation of the diagnosis unit to be valid when the detecting operation of the detecting unit in the open condition and the detecting operation of the detecting unit in the close condition are continuously performed.

Alternatively, a diagnosis apparatus for a secondary air supply system for an internal combustion engine has an exhaust passage, which connects with an exhaust gas purification apparatus. The secondary air supply system includes a secondary air supply passage, an air pump, and a detecting unit. The secondary air supply passage connects with the exhaust passage. The air pump is adapted to supplying secondary air to an upstream of the exhaust gas purification apparatus, in the exhaust passage of the internal combustion engine, through the secondary air supply passage. The detecting unit is adapted to detecting a detection object of secondary air. The diagnosis apparatus includes a diagnosis unit, an obtaining unit, and a changing unit. The diagnosis unit is adapted to performing a diagnosis operation to evaluate an abnormity of the secondary air supply system in accordance with a detection result of the detecting unit. The obtaining unit is adapted to obtaining information of temperature of the air pump. The changing unit is adapted to changing the diagnosis operation of the diagnosis unit in accordance with the information of the temperature of the air pump.

Alternatively, a diagnosis apparatus is provided to a secondary air supply system that supplies secondary air into an exhaust passage of an internal combustion engine using a secondary air supply apparatus. The secondary air supply apparatus is constructed of components including a secondary air passage, a valve, and an air pump. The secondary air passage connects with an exhaust passage of the internal combustion engine. The valve is provided to the secondary air passage. The air pump is provided to the secondary air passage. The diagnosis apparatus includes a parameter obtaining unit and an evaluating unit. The parameter obtaining unit is adapted to obtaining a temperature parameter, which corresponds to temperature of at least one of the components constructing the secondary air supply apparatus when the internal combustion engine is started. The evaluating unit is adapted to evaluating whether the secondary air supply apparatus is in a frozen condition in accordance with the temperature parameter.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
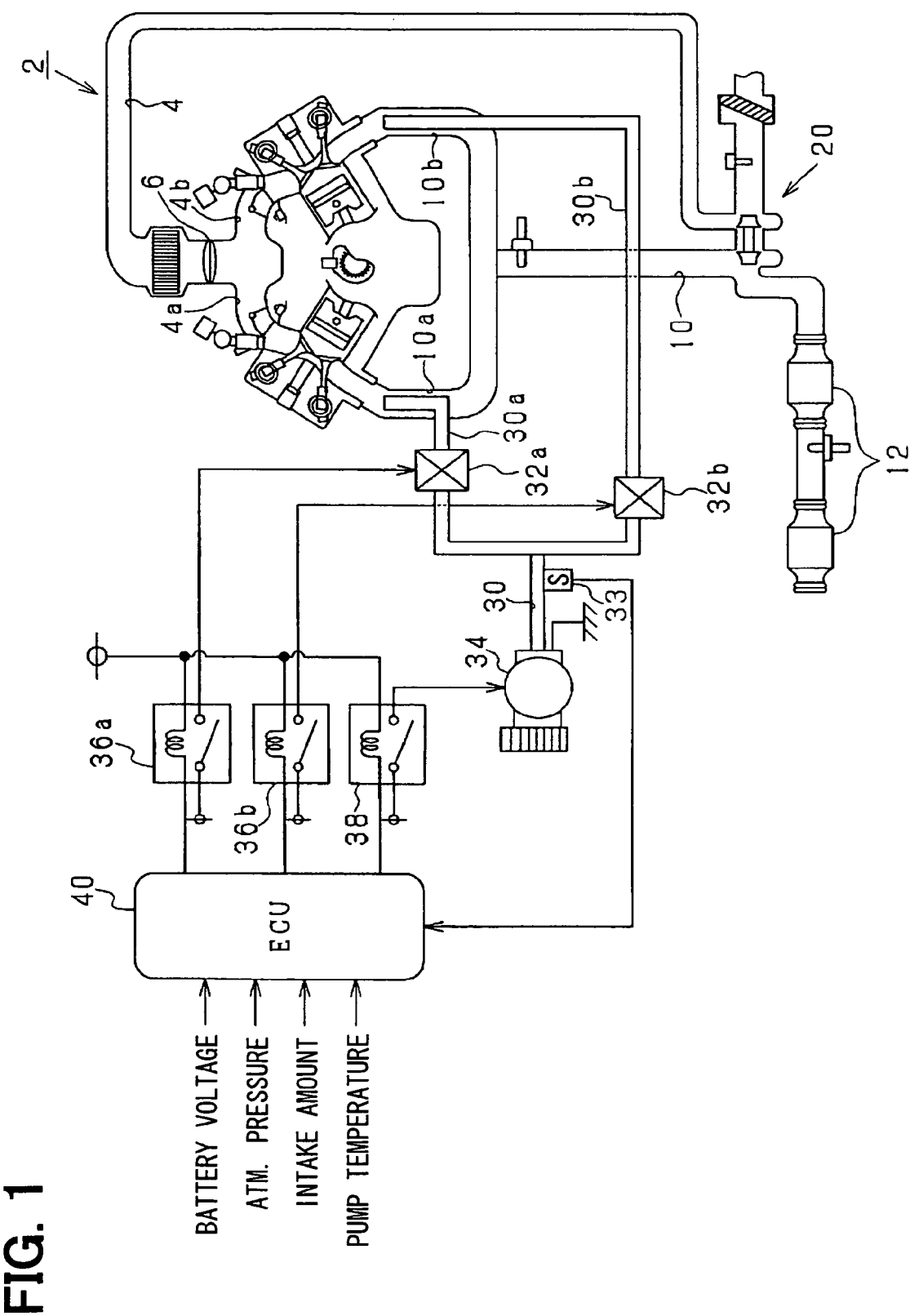
FIG. 1 is a schematic view showing a secondary air supply system for an internal combustion engine, according to a first embodiment of the present invention.

As shown in FIG. 1, an internal combustion engine 2 has an intake passage 4, to which a throttle valve 6 is provided. The engine 2 is a V-type engine, for example. THE engine 2 has left and right banks. The intake passage 4 is divided into an intake passage 4a of the left bank and an intake passage 4b of the right bank in the downstream of the throttle valve 6. Specifically, in case of a four-cylinder V-engine, one of the intake passages 4a, 4b connects with two cylinders after being divided. Alternatively, in case of a six-cylinder V-engine, one of the intake passages 4a, 4b connects with three cylinders after being divided.

The engine 2 has an exhaust passage 10, to which an exhaust purification apparatus 12 is provided. The exhaust passage 10 and the intake passage 4 interpose a turbocharger (charging device) 20 therebetween.

The exhaust passage 10 is divided into exhaust passages 10a, 10b, in the upstream thereof, corresponding to the intake passages 4a, 4b, which are divided from the intake passage 4. The exhaust passages 10a, 10b respectively connect with secondary air supply passages 30a, 30b. Secondary air is supplied into the exhaust passages 10a, 10b respectively through the secondary air supply passages 30a, 30b.

The secondary air supply passages 30a, 30b are respectively provided with valves 32a, 32b, for respectively communicating and blocking the secondary air supply passages 30a, 30b. The secondary air supply passages 30a, 30b merge with each other into a secondary air supply passage 30 in the upstream of the valves 32a, 32b. The secondary air supply passage 30 is provided with a pressure sensor 33 for detecting pressure in the secondary air supply passage 30. The upstream of the secondary air supply passage 30 is provided with an air pump 34.

The valves 32a, 32b are respectively supplied with electricity respectively via valve relays 36a, 36b. The air pump 34 is supplied with electricity via a pump relay 38.

An electronic control unit (ECU) 40 is constructed of a central processing unit, a memory, and the like. The ECU 40 inputs various signals such as a detection signal of the pressure sensor 33, which detects pressure in the secondary air supply passage 30, voltage of a battery, and detection signals of atmospheric pressure, an amount of intake air, temperature of the air pump 34, and the like. The battery supplies electricity to electric devices such as the air pump 34. In particular, the ECU 40 operates the valves 32a, 32b, and the air pump 34 via the valve relays 36a, 36b, and the pump relay 38, so that secondary air is supplied into the exhaust passages 10a, 10b.

The ECU 40 performs a diagnosis operation for evaluating abnormity in a secondary air supply system, which includes a secondary air supply passages 30a, 30b, and 30, the valves 32a, 32b, the air pump 34, the valve relays 36a, 36b, and the pump relay 38.

Figure 2:
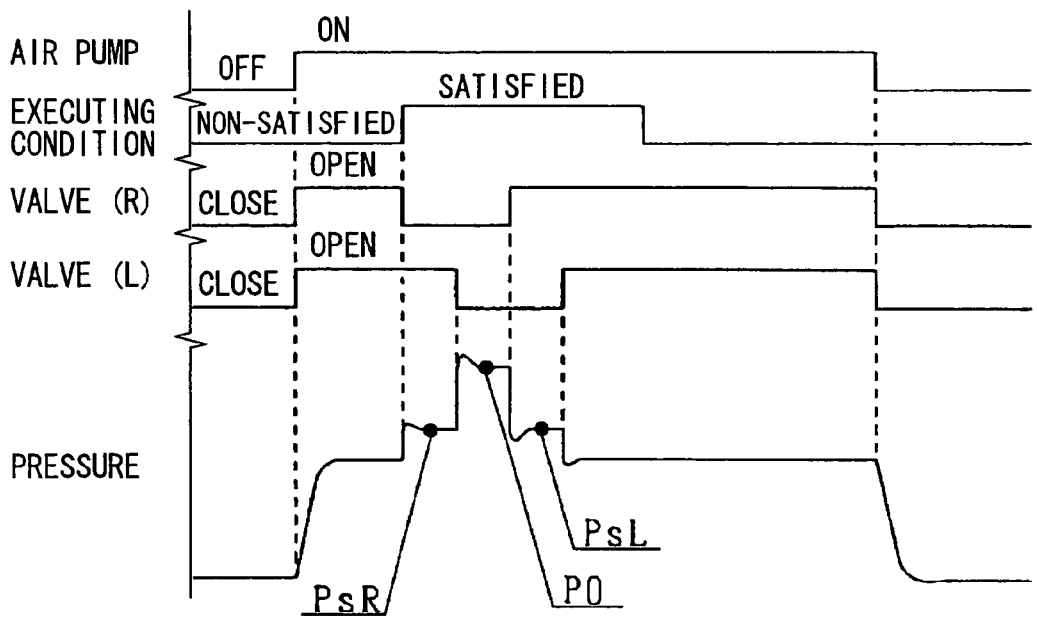
FIG. 2 is a time chart showing a diagnosis operation of the secondary air supply system, according to the first embodiment.

As follows, the diagnosis operation is described. As shown in FIG. 2, the valves 32a, 32b and the air pump 34 are operated, and pressure is detected using the pressure sensor 33.

As shown in FIG. 2, the diagnosis operation is performed when the air pump 34 is started, and the valves 32a, 32b are opened. That is, supplying secondary air is a condition for starting the diagnosis operation.

When the executing condition for the diagnosis operation of the secondary air supply apparatus is satisfied, pressure in the secondary air supply passage 30 is detected in the following manner and order. First, pressure PsR, when only the valve 32a is opened, is detected. Second, pressure P0, when both the valves 32a, 32b are opened, is detected. Third, pressure PsL, when only the valve 32b is opened, is detected. A flow amount of secondary air supplied into the exhaust passages 10a, 10b through the secondary air supply passage 30 is detected on the basis of the pressure PsR, P0, and PsL. Thus, abnormity of the secondary air supply system is evaluated on the basis of the flow amount of secondary air.

Next, the reason of using the pressure P0 for calculating the flow amount of secondary air is described. The pressure PsR is pressure in the secondary air supply passage 30, and the pressure PsR corresponds to the flow amount of secondary air supplied into the exhaust passage 10a. The pressure PsL is pressure in the secondary air supply passage 30, and the pressure PsL corresponds to the flow amount of secondary air supplied into the exhaust passage 10b. Therefore, the flow amount of secondary air supplied into the exhaust passages 10a, 10b can be generally detected in accordance with only the pressure PsR, PsL. However, as the altitude of the vehicle changes, the atmospheric pressure may vary, for example. In this condition, as the atmosphere pressure changes, pressure in the secondary air supply passage 30 may change. Therefore, the flow amount of secondary air detected on the basis of the pressure PsR, PsL may be affected by the detecting operation of the atmospheric pressure using the pressure sensor 33. Therefore, in this example embodiment, the pressure P0 is additionally taken into account in the calculation of the flow amount of secondary air in order to reduce the effect because of detecting the atmospheric pressure using the pressure sensor 33.

As follows, the diagnosis operation is described in reference to FIG. 3 to FIG. 8. These processings shown in FIG. 3 to FIG. 8 are executed at predetermined intervals, for example.

In step S10, it is evaluated whether eight executing conditions of the diagnosis operation are at least partially satisfied. These eight executing conditions are described as follows.

First, the air pump 34 is operated continuously for a predetermined period. This condition is set for performing the diagnosis operation when secondary air is stably supplied from the air pump 34. When this condition, in which the air pump 34 is continuously operated for the predetermined period, is satisfied, the above condition, in which secondary air is supplied, is also satisfied.

Figure 4:
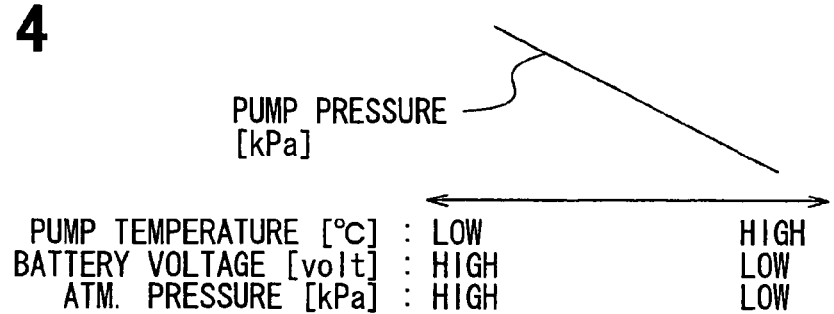
FIG. 4 is a graph showing a relationship between discharge pressure of an air pump of the secondary air supply system and parameters, according to the first embodiment.

Second, the atmospheric pressure is higher than a predetermined threshold continuously for a predetermined period. As shown in FIG. 4, as the atmospheric pressure becomes high, pressure of secondary air supplied from the air pump 34 increases. Specifically, as the atmospheric pressure becomes high, atmosphere around the air pump 34 becomes dense, so that capacity of the air pump 34 for supplying secondary air is enhanced. By contrast, as the atmospheric pressure becomes low, the pressure PsL, PsR, and P0 shown in FIG. 2 becomes low. In this condition, difference between pressure PsL, PsR and pressure P0 becomes small. Accordingly, when the atmospheric pressure is excessively low, it becomes difficult to accurately detect the flow amount of secondary air. Therefore, in this example embodiment, the threshold is set at a value, by which it can be evaluated whether the atmospheric pressure is sufficient for properly securing flow amount of secondary air. Here, the condition of being continuously for the predetermined period is defined for detecting the flow amount of secondary air in a condition where the atmospheric pressure is stably higher than the predetermined threshold.

Third, temperature of the air pump 34 is less than a predetermined threshold continuously for a predetermined period. As shown in FIG. 4, as the temperature of the air pump 34 becomes high, pressure of secondary air supplied from the air pump 34 decreases. Specifically, as the temperature of the air pump 34 becomes high, the discharge capacity of the air pump 34 for supplying secondary air decreases. Therefore, as the temperature of the air pump 34 becomes high, the pressure PsL, PsR, P0 shown in FIG. 2 becomes low. In addition, in this condition, difference between pressure PsL, PsR and pressure P0 becomes small. Accordingly, when the temperature of the air pump 34 is excessively high, it becomes difficult to accurately detect the flow amount of secondary air. Therefore, in this example embodiment, the threshold is set at a value, by which it can be evaluated whether the air pump 34 is capable of properly securing the flow amount of secondary air. Here, the condition of being continuously for the predetermined period is defined for detecting the flow amount of secondary air in a condition where the temperature of the air pump 34 is stably lower than the predetermined threshold.

Fourth, voltage (battery voltage) of the battery is within a predetermined range. As referred to FIG. 4, as the battery voltage becomes high, pressure of secondary air supplied from the air pump 34 becomes high. By contrast, as the battery voltage becomes low, the discharge capacity of the air pump 34 decreases. When the battery voltage is extremely high, or is extremely low, the difference between pressure PsL, PsR and pressure P0 becomes small. Accordingly, when the battery voltage is extremely high, or is extremely low, it becomes difficult to accurately detect the flow amount of secondary air. Therefore, in this example embodiment, the predetermined range is set at a range, in which the flow amount of secondary air can be properly secured.

Fifth, variation in the battery voltage is equal to or less than a predetermined threshold. This condition is defined for detecting the flow amount of secondary air in a condition where the battery voltage is stable. Specifically, when the battery voltage is not stable, the capacity of the air pump 34 varies. Therefore, the condition of the variation in the battery voltage is defined for detecting the flow amount of secondary air in a condition where the capacity of the air pump 34 is stable.

Sixth, an amount (intake amount) of intake air is within a predetermined range. As the intake amount becomes large, pressure in the secondary air supply passages 30a, 30b increases, when the valves 32a, 32b are opened. Specifically, as the intake amount becomes large, exhaust pressure becomes high. When the intake amount is extremely large, for example, the difference between pressure PsL, PsR and pressure P0 becomes small. Accordingly, when the intake amount is extremely large, or extremely small, it becomes difficult to accurately detect the flow amount of secondary air. Therefore, in this example embodiment, the predetermined range is set at a range, in which the flow amount of secondary air can be properly secured.

Seventh, variation in the intake amount is equal to or less than a predetermined threshold. This condition is defined for detecting the flow amount of secondary air in a condition where the intake amount is stable. Specifically, when the intake amount is not stable, pressure in the secondary air supply passage 30 varies. Therefore, the condition of the variation in the intake amount is defined for detecting the flow amount of secondary air in a condition where the intake amount is stable.

Eighth, the number of operations of the valves 32a, 32b for performing the diagnosis operation is less than a predetermined threshold. This condition is defined for restricting the number of the operations of the valves 32a, 32b from becoming extremely high due to repeating the operation of the valves 32a, 32b.

In step S10 shown in FIG. 3, when the executing conditions of the diagnosis operation are satisfied, the routine proceeds to step S12, in which the pressure PsR, pressure P0, and pressure PsL are subsequently detected. As follows, this detecting operation of pressure is described in detail.

Figure 5:
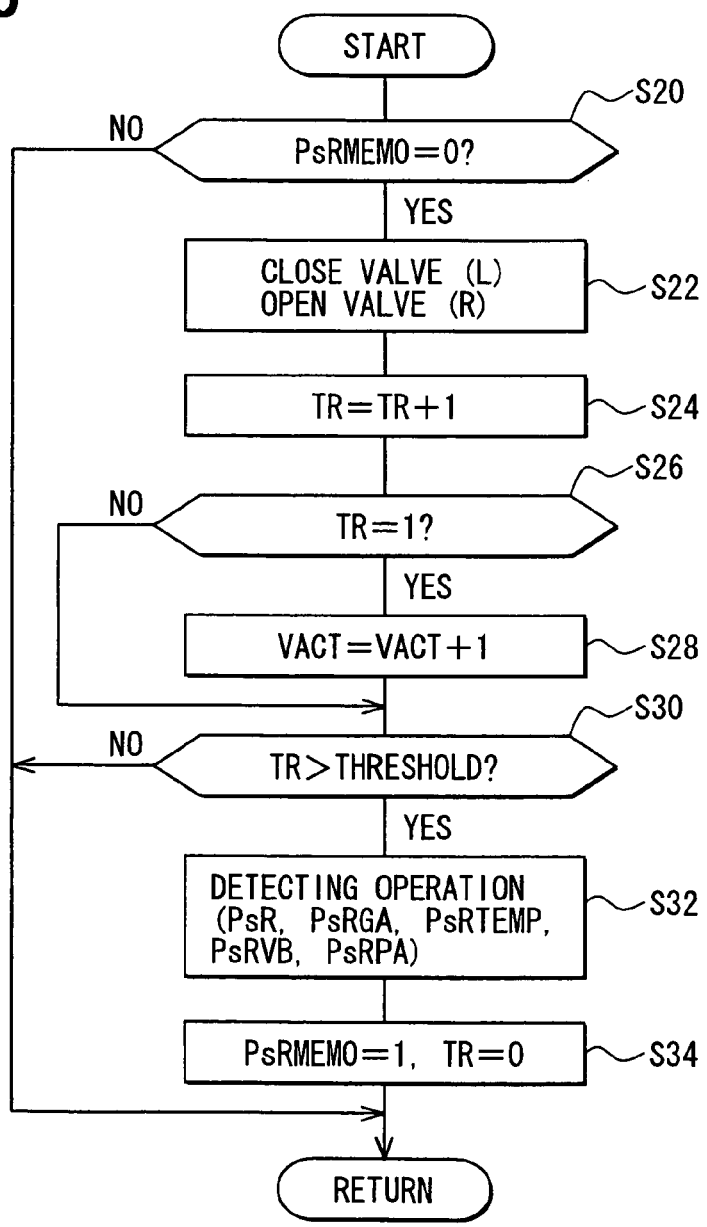
FIG. 5 is a flow chart showing a routine for detecting pressure in the diagnosis operation of the secondary air supply system, according to the first embodiment.

As shown in FIG. 5, in step S20, it is evaluated whether detection of pressure in the secondary air supply passage 30 is completed in a condition where only the valve 32a is opened. Specifically, it is evaluated whether a PsR flag (PsRMEMO) is turned OFF, i.e. the PsRMEMO is set at 0. The PsR flag (PsRMEMO) is turned ON when the detecting operation of the pressure in the secondary air supply passage 30 is completed.

When the detecting operation of the pressure in the secondary air supply passage 30 is not completed, the PsRMEMO is set at 0, so that the routine proceeds to step S22, in which the ECU 40 closes the valve 32b (VALVE (L)), and opens the valve 32a (VALVE (R)). In step S24, the ECU 40 increments a timer TR, which counts a time elapsing after performing the operation in step S22. In steps S26, S28, the ECU 40 counts the number of the operations of the valves 32a, 32b for the diagnosis operation. In step S26, it is evaluated whether the count of the timer TR is 1. When the count of the timer TR is determined to be 1 in step S26, the routine proceeds to step S28, in which the ECU 40 increments a counter VACT, which counts the number of the operations of the valves 32a, 32b. Specifically, in this example embodiment, the ECU 40 counts the number of the operations of the valves 32a, 32b every time the count of the timer TR becomes 1 in the diagnosis operation. The ECU 40 has a volatile memory such as a RAM, which stores the count of the counter VACT, for example. The volatile memory stores information thereof by being supplied with electricity. The executing conditions of the diagnosis operation in step S10 in FIG. 3 includes the condition, in which the counter VACT is less than the predetermined threshold, so that the number of the operations of the valves 32a, 32b can be restricted during the period between the ignition switch is turned ON and is turned OFF. Thus, the valves 32a, 32b can be restricted from causing excessive ablation. The ECU 40 refers the count of the counter VACT in the executing conditions of the diagnosis operation in step S10 shown in FIG. 3. In step S30, it is evaluated whether the count of the timer TR is greater than a predetermined threshold in at least one of the conditions where the timer TR is not determined to be 1 in step S26 and the operation in step S28 is completed.

This threshold in step S30 is determined such that it is conceived that pressure in the secondary air supply passage 30 becomes stable after elapsing time, which is equivalent to this threshold, from performing the operation in step S22 in a normal condition of the secondary air supply system.

In step S30, when the count of the timer TR is determined to be greater than the predetermined threshold, the routine proceeds to step S32. In step S32, the ECU 40 obtains detection signals detected using various sensors such as the pressure sensor 33. Specifically, the ECU 40 obtains the pressure PsR in the secondary air supply passage 30, and further obtains the intake amount PsRGA, the temperature of the air pump PsRTEMP, the battery voltage PsRVB, the atmospheric pressure PsRPA, and the like. In step S34, the ECU 40 turns the PsR flag (PsRMEMO) ON, and initializes the timer TR at 0.

Figure 6:
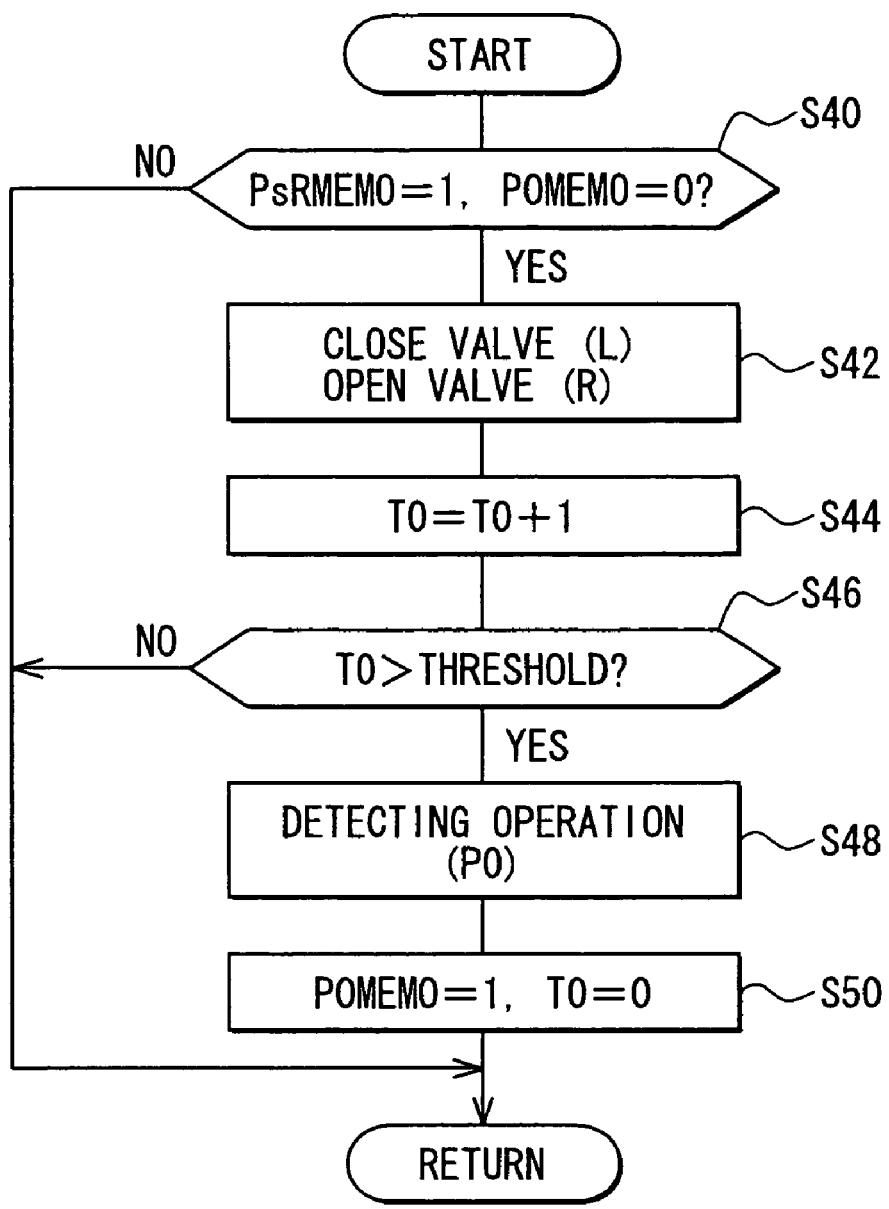
FIG. 6 is a flow chart showing a routine for detecting pressure in the diagnosis operation of the secondary air supply system, according to the first embodiment.

The routine proceeds to steps in FIG. 6 in at least one of the conditions where the detecting operation is determined to be completed in step S20, the timer TR is determined to be equal to or less than the threshold in step S30, and the operation in step S34 is completed.

In steps in FIG. 6, the detecting operation of the pressure P0 is performed. Specifically, in step S40, it is evaluated whether the detecting operation in step S32 in FIG. 5 is completed, and it is evaluated whether the detecting operation in the condition where the valves 32a, 32b are closed is not completed. More specifically, it is evaluated whether the PsR flag (PsRMEMO) is turned ON, i.e. the PsRMEMO is set at 1, and a P0 flag (P0MEMO) is turned OFF, i.e. the P0MEMO is set at 0. The P0 flag (P0MEMO) is turned ON when the detecting operation of the pressure P0 is completed. In step S40, when the detecting operation of the pressure PsR is completed, and the detecting operation of the pressure P0 is not completed, the routine proceeds to step S42. In step S42, the ECU 40 closes both the valve 32b (VALVE (L)) and the valve 32a (VALVE. (R)).

In step S44, the ECU 40 increments a timer T0, which counts the time elapsing after performing the operation in step S42. In step S46, it is evaluated whether the count of the timer T0 is greater than a predetermined threshold. This threshold is determined such that it is conceived that pressure in the secondary air supply passage 30 becomes stable after elapsing time, which is equivalent to this threshold, from performing the operation in step S42 in the normal condition of the secondary air supply system.

When the count of the timer T0 is determined to be greater than the threshold in step S46, the routine proceeds to step S48, in which the ECU 40 obtains detection signal of the pressure sensor 33, which detects pressure in the secondary air supply passage 30. In step S50, the ECU 40 turns the P0 flag (P0MEMO) ON, and initializes the timer T0 at 0.

Figure 7:
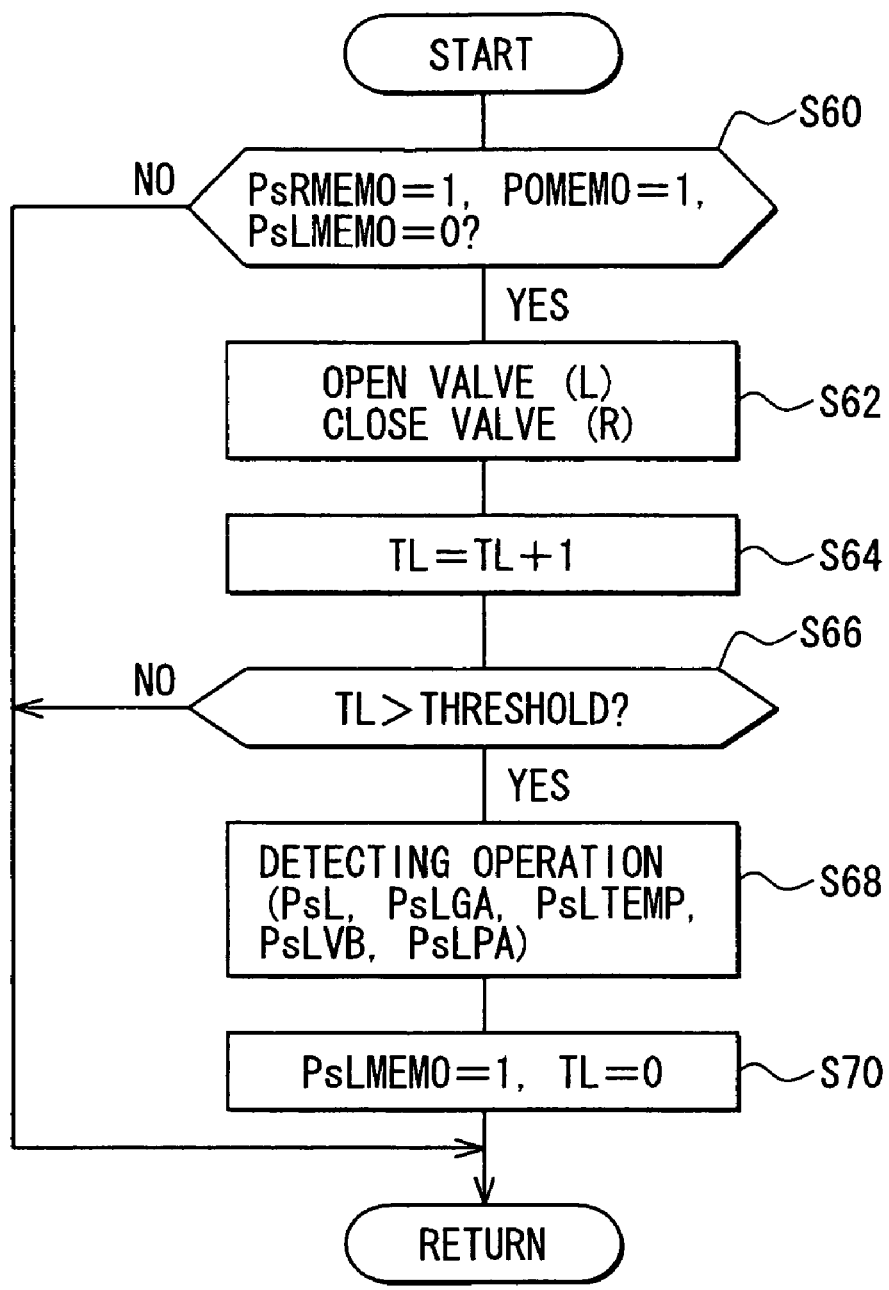
FIG. 7 is a flow chart showing a routine for detecting pressure in the diagnosis operation of the secondary air supply system, according to the first embodiment.

The routine proceeds to steps in FIG. 7 in at least one of the conditions where the detecting operation of the pressure PsR is not completed in step S40, the detecting operation of the pressure P0 is completed in step S40, the timer T0 is determined to be equal to or less than the threshold in step S46, and the operation in step S50 is completed.

In steps in FIG. 7, the detecting operation of the pressure PsL is performed. Specifically, in step S60, it is evaluated whether the detecting operations in steps shown in FIGS. 5, 6 are completed, and it is evaluated whether the detecting operation of the pressure in the secondary air supply passage 30 in the condition where only the valve 32b is opened is not completed. More specifically, it is evaluated whether both the PsR flag (PsRMEMO) and the P0 flag (P0MEMO) are turned ON, i.e. the PsRMEMO and the P0MEMO are set at 1, and a PsL flag (PsLMEMO) is turned OFF, i.e. the PsLMEMO is set at 0. The PsL flag is turned ON when the detecting operation of the pressure PsL is completed. In step S60, when the detecting operations of the pressure PsR, P0 are completed, and the detecting operation of the pressure PsL is not completed, the routine proceeds to step S62. In step S62, the ECU 40 opens the valve 32b (valve (L)), and closes the valve 32a (valve (R)). In step S64, the ECU 40 increments a timer TL, which counts the time elapsing after performing the operation in step S62. In step S66, it is evaluated whether the count of the timer TL is greater than a predetermined threshold. This threshold is determined such that it is conceived that pressure in the secondary air supply passage 30 becomes stable after elapsing time, which is equivalent to this threshold, from performing the operation in step S62 in the normal condition of the secondary air supply system.

When the count of the timer TL is determined to be greater than the threshold, the routine proceeds to step S68. In step S68, the ECU 40 obtains detection signals detected using various sensors such as the pressure sensor 33. Specifically, the ECU 40 obtains the pressure PsL in the secondary air supply passage 30, and further obtains the intake amount PsLGA, the temperature of the air pump PsLTEMP, the battery voltage PsLVB, the atmospheric temperature PsLPA, and the like. In step S70, the ECU 40 turns the PsL flag (PsLMEMO) ON, and initializes the timer TL at 0. In this condition, the ECU 40 opens both the valves 32a, 32b. Specifically, the executing conditions shown in step S10 in FIG. 3 includes the condition, in which secondary air is supplied so that the intake amount is within the predetermined range. Therefore, the ECU 40 opens both the valves 32a, 32b in order to restart supplying secondary air when the detecting operation is completed.

Figure 3:
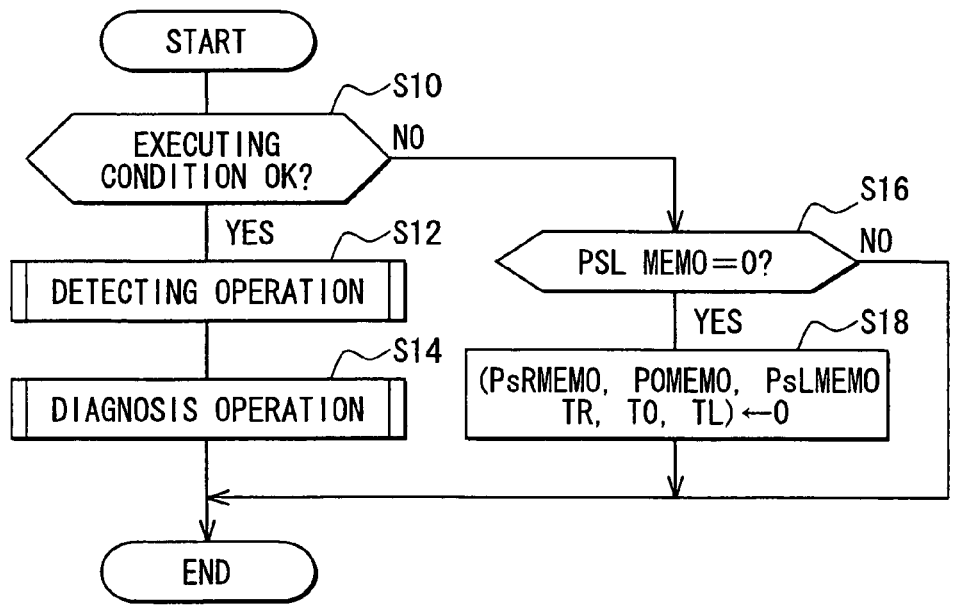
FIG. 3 is a flow chart showing a routine for the diagnosis operation of the secondary air supply system, according to the first embodiment.

The operation in step S12 shown in FIG. 3 is completed when at least one of the following conditions is satisfied. First, in step S60, at least one of the conditions where the detecting operation of the pressure PsR is not completed, the detecting operation of the pressure P0 is not completed, and the detecting operation of the pressure PsL is completed, is satisfied. Second, in step S66, the condition where the count of the timer TL is equal to or less than the threshold is satisfied. Third, the operation in step S70 is completed. When the operation in step S12 is completed, the routine proceeds to step S14 in FIG. 3.

As follows, the operation in step S14 is described in reference to FIG. 8. In step S80, it is evaluated whether the detecting operation of the pressure PsL is completed. That is, it is evaluated whether the PsL flag (PsLMEMO) is turned ON, and the PsLMEMO is set at 1. In this condition, it is evaluated whether all the detecting operation, in which only the valve 32a is opened, the detecting operation, in which both the valves 32a, 32b are closed, and the detecting operation, in which only the valve 32b is opened, are completed. When all the three detecting operations are determined to be completed, the routine proceeds to step S82, in which the ECU 40 calculates the flow amount (secondary air amount) of secondary air when only the valve 32a is opened, and the secondary air amount when only the valve 32b is opened.

Specifically, the ECU 40 calculates the secondary air amount when only the valve 32a is opened, on the basis of a data map, in accordance with the pressure PsR when only the valve 32a is opened and the pressure P0 when both the valves 32a, 32b are closed. This data map may be defined on the basis of one of experimental data and the following equation.

$$SALFLOWR = CA\sqrt{\frac{2}{\rho}(P0 - PsR)} \quad (c1)$$

In this equation (c1), ρ indicates the fluid density, C is a coefficient, and A indicates the cross sectional area of the secondary air supply passage 30.

In addition, the ECU 40 calculates the secondary air amount when only the valve 32b is opened, on the basis of a data map, in accordance with the pressure PsL when only the valve 32b is opened and the pressure P0 when both the valves 32a, 32b are closed. This data map may be defined on the basis of one of experimental data and the following equation.

$$SALFLOWL = CA\sqrt{\frac{2}{\rho}(P0 - PsL)} \quad (c2)$$

In this equation (c2), ρ indicates the fluid density, C is a coefficient, and A indicates the cross sectional area of the secondary air supply passage 30.

In steps following to step S84, it is evaluated whether the secondary air supply system causes an abnormity in accordance with whether the secondary air amount calculated in step S82 satisfies conditions. Specifically, in step S84, the ECU 40 calculates an abnormity threshold, which is for evaluating the secondary air amount when only the valve 32a is opened, and an abnormity threshold, which is for evaluating the secondary air amount when only the valve 32b is opened. These abnormity thresholds include lower limit values LOFAILR, LOFAILL, and upper limit values HIFAILR, HIFAILL.

When the secondary air supply system is in the normal condition, the secondary air amount is in a range between one of the lower limit values LOFAILR, LOFAILL and corresponding one of the upper limit values HIFAILR, HIFAILL. The secondary air amount in this range is defined as a reference of the secondary air amount.

The lower limit value LOFAILR is calculated in accordance with the intake amount PsRGA, the temperature (pump temperature PsRTEMP) of the air pump, the battery voltage PsRVB, the atmospheric pressure PsRPA, and the like, in the condition where only the valve 32a is opened. The intake amount PsRGA has a correlation with respect to the exhaust pressure. The secondary air amount can be estimated in accordance with the exhaust pressure, in general, when the capacity of the air pump 34 and an operating condition such as the atmospheric pressure are substantially constant. In this example embodiment, the ECU 40 calculates the base value on the basis of the intake amount PsRGA. The ECU 40 further calculates a pump temperature correction term in accordance with the pump temperature PsRTEMP, in consideration of that the capacity of the air pump 34 varies corresponding to the temperature of the air pump 34. The ECU 40 further calculates a battery voltage correction term in accordance with the battery voltage PsRVB, in consideration of that the capacity of the air pump 34 varies corresponding to the voltage of the battery. The ECU 40 further calculates an atmospheric pressure correction term in accordance with the atmospheric pressure PsRPA in consideration of that the discharge pressure of the air pump 34 increases as the atmospheric pressure becomes high, because atmospheric density around the air pump 34 increases. The ECU 40 multiplies the base value by the pump temperature correction term, the battery voltage correction term, and the atmospheric pressure correction term, thereby calculating the lower limit value LOFAILR.

The ECU 40 calculates the upper limit value HIFAILR in accordance with the intake amount PsRGA, the pump temperature PsRTEMP, the battery voltage PsRVB, and the atmospheric pressure PsRPA in the condition where only the valve 32a is opened, similarly to the calculation of the lower limit value LOFAILR.

The ECU 40 calculates the lower limit value LOFAILL and the upper limit value HIFAILL in accordance with the intake amount PsLGA, the pump temperature PsLTEMP, the battery voltage PsLVB, and the atmospheric pressure PsLPA, in the condition where only the valve 32b is opened, similarly to the calculation of the lower limit value LOFAILR.

In step S82, the ECU 40 calculates the secondary air mount in accordance with the pressure P0 when both the valves 32a, 32b are closed, in addition to the pressure PsR, PsL, in order to reduce variation caused in the calculation of the secondary air amount due to variation in the atmospheric pressure. Specifically, the atmospheric pressure exerts influence to pressure in the secondary air supply passage 30, consequently, the atmospheric pressure affects the calculation of the secondary air amount in step S82. In addition, in step S84, the ECU 40 multiplies the atmospheric pressure correction term in consideration of the variation in the capacity of the air pump 34 because of fluctuation in the air density corresponding to the atmospheric pressure. The above two atmospheric pressure correcting operations are different from each other.

Steps S86 to S96 are executed after completing the operation in step S84. Specifically, in step S86, it is evaluated whether the secondary air amount SALFLOWR is less than the lower limit value LOFAILR, and it is evaluated whether the secondary air amount SALFLOWL is less than the lower limit value LOFAILL. When the secondary air amount SALFLOWR is less than the lower limit value LOFAILR, the routine proceeds to step S88, in which the secondary air amount is determined to be decreased when only the valve 32a is opened, and it is determined that an abnormity is caused in the secondary air supply system. By contrast, when the secondary air amount SALFLOWR is equal to or greater than the lower limit value LOFAILR, the routine proceeds to step S90, in which the secondary air supply system is determined to be normal when only the valve 32a is opened.

When the secondary air amount SALFLOWL is less than the lower limit value LOFAILL, the routine proceeds to step S88, in which the secondary air amount is determined to be decreased when only the valve 32b is opened, and it is determined that an abnormity is caused in the secondary air supply system. By contrast, when the secondary air amount SALFLOWL is equal to or greater than the lower limit value LOFAILL, the routine proceeds to step S90, in which the secondary air supply system is determined to be normal when only the valve 32b is opened.

In step S92, it is evaluated whether the secondary air amount SALFLOWR is greater than the upper limit value HIFAILR, and it is evaluated whether the secondary air amount SALFLOWL is greater than the upper limit value HIFAILL. When the secondary air amount SALFLOWR is greater than the higher limit value HIFAILR, the routine proceeds to step S94, in which the secondary air amount is determined to be excessively increased when only the valve 32a is opened, and it is determined that an abnormity is caused in the secondary air supply system. By contrast, when the secondary air amount SALFLOWR is equal to or less than the higher limit value HIFAILR, the routine proceeds to step S96, in which the secondary air supply system is determined to be normal when only the valve 32a is opened. When the secondary air amount SALFLOWL is greater than the upper limit value HIFAILL, the routine proceeds to step S94, in which the secondary air amount is determined to be excessively increased when only the valve 32b is opened, and it is determined that an abnormity is caused in the secondary air supply system. By contrast, when the secondary air amount SALFLOWL is equal to or less than the upper limit value HIFAILL, the routine proceeds to step S96, in which the secondary air supply system is determined to be normal when only the valve 32b is opened.

The ECU 40 once terminates the operation shown in FIG. 3 in one of the following conditions. First, in step S80, it is determined that the detecting operation of the pressure PsL when only the valve 32b is opened is not completed. Second, the operations in steps S94, S96 are completed.

By contrast, as referred to FIG. 3, when the executing condition in step 10 is not satisfied, the routine proceeds to step S16, in which it is evaluated whether the detecting operation of pressure PsL is completed or not. Specifically, it is evaluated whether the detecting operations of the pressure PsR, pressure P0, and pressure PsL are subsequently performed, after the executing condition is satisfied. When the detecting operation of the pressure PsL is not completed, the routine proceeds to step S18, in which the ECU 40 initializes the PsR flag (PsRMEMO), P0 flag (P0MEMO), and PsL flag (PsLMEMO), and initializes the timers TR, T0, and TL at 0, in order to defeat the operations related to the diagnosis operation performed until the moment. The operations related to steps S16, S18 serve as a reliability maintaining unit that validates the diagnosis operation when the detecting operations of the pressure PsR, P0, and PsL are subsequently performed, in this example embodiment.

The ECU 40 once terminates the operations in one of a condition where the detecting operation of the pressure PsL is completed in step S16, and a condition where the operation in step S18 is completed.

As follows, effects of this embodiment are described.

First, the operating results related to the diagnosis operation are defeated when the executing conditions are not satisfied in the diagnosis operation. Therefore, the ECU 40 further performs another diagnosis operation, when the diagnosis operation is once defeated, in the case where the executing condition is satisfied again. Therefore, accuracy of the diagnosis operation can be restricted from being degraded due to difference between a timing of the detecting operation using the pressure sensor 33, when one of the valves 32a, 32b are opened, and the timing of the detecting operation, when both the valves 32a, 32b are closed.

Second, the detecting operation using the pressure sensor 33, when only the valve 32a is opened, is performed in advance of the detecting operation using the pressure sensor 33 when both the valves 32a, 32b are closed. The detecting operation using the pressure sensor 33, when only the valve 32b is opened is performed, subsequent to the detecting operation using the pressure sensor 33 when both the valves 32a, 32b are closed. By these sequential operations, the detecting operation of the pressure PsR and P0 can be subsequently performed, and the detecting operation of the pressure P0 and PsL can be subsequently performed.

Third, the ECU 40 calculates the limit values LOFAILR, LOFAILL, HIFAILR, and HIFAILL, in accordance with the atmospheric pressure PsRPA, PsLPA for evaluating abnormity of the secondary air supply system. Therefore, the ECU 40 is capable of calculating the thresholds, which are references of the secondary air amount, in accordance with variation in secondary air amount caused by variation in pressure in the exhaust passage.

Fourth, the ECU 40 corrects the base value, which is calculated in accordance with the intake amount PsRPA, PsLPA, on the basis of the atmospheric pressure. Therefore, the ECU 40 is capable of correcting the base value in consideration of variation in the secondary air amount due to variation in air density corresponding to variation in atmospheric pressure.

Fifth, the ECU 40 corrects the base value, which is calculated in accordance with the intake amount PsGPA, PsLGA, on the basis of the battery voltage. Therefore, the ECU 40 is capable of correcting the base value in consideration of increase in discharge pressure of secondary air supplied from the air pump 34, as the battery voltage becomes high.

Sixth, the ECU 40 corrects the base value, which is calculated in accordance with the intake amount PsRGA, PsLGA, on the basis of the temperature of the air pump 34. Therefore, the ECU 40 is capable of correcting the base value in consideration of decrease in the secondary air amount as the temperature of the air pump 34 becomes high.

Seventh, the ECU 40 permits performing the diagnosis operation when the counter VACT is less than the predetermined threshold. The counter VACT is used for counting the number of the operations of the valves 32a, 32b in the diagnosis operation. Therefore, durability of the valves 32a, 32b can be restricted from being reduced due to excessively increasing the number of the operations of the valves 32a, 32b by repeating the diagnosis operation.

Variation of the First Embodiment

As follows, variations of this embodiment are described.

Figure 8:
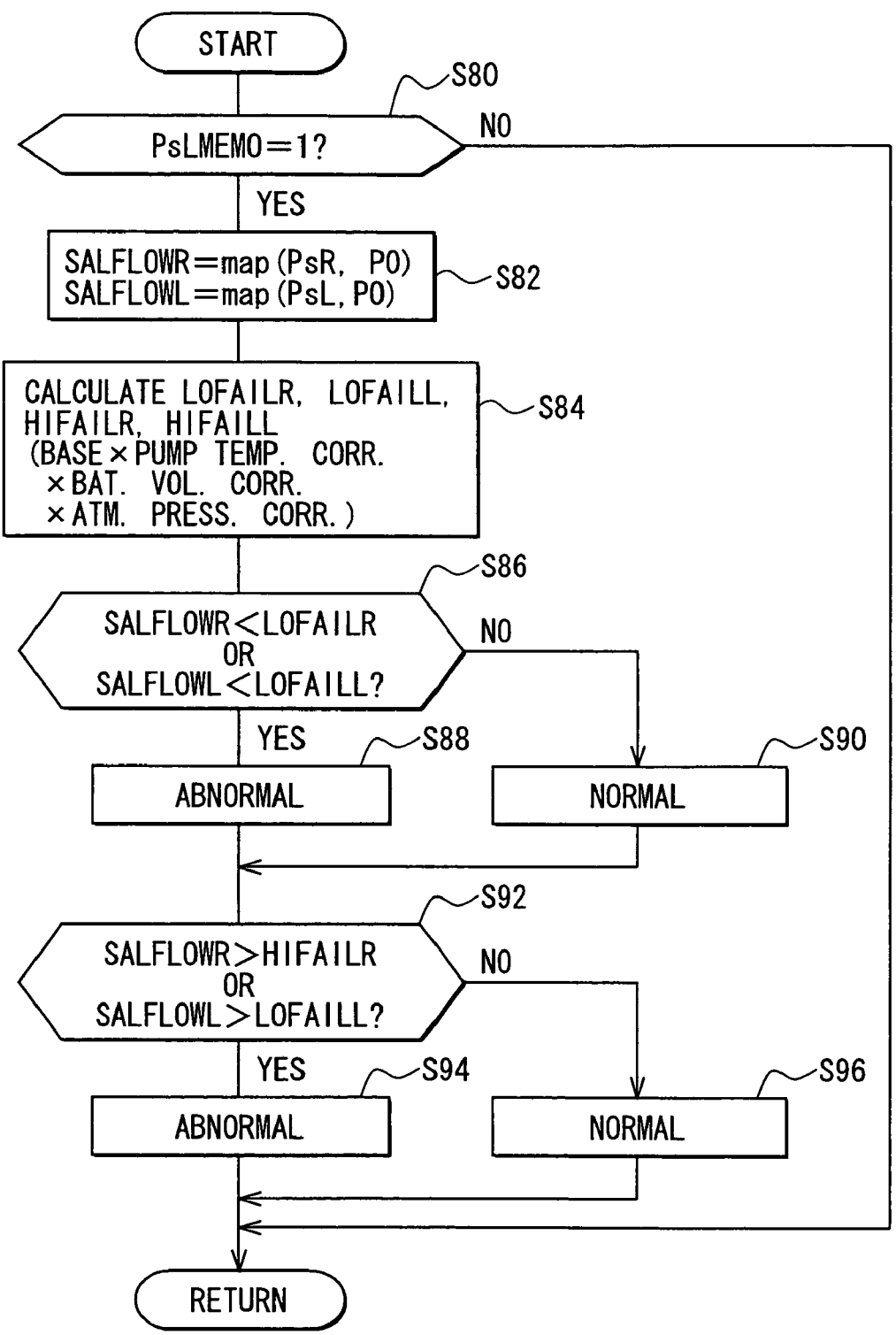
FIG. 8 is a flow chart showing a routine for the diagnosis operation of the secondary air supply system, according to the first embodiment.

The diagnosis operation shown in FIG. 8 may be performed even when the executing conditions of the diagnosis operation is not satisfied. The operations, which are needed when the executing conditions are satisfied, are detecting operations of the pressure PsR, P0, and PsL, and the like. Therefore, the operations shown in FIG. 8 need not be performed as the subroutine of the operations shown in FIG. 3. The operations shown in FIG. 8 may be performed as an individual routine.

The timings, on which the ECU 40 counts the number of the operations of the valves 32a, 32b in the diagnosis operation, is not limited to those in the above operation. For example, the timing may be when the count of the timer TL becomes greater than a threshold.

The first to fifth and seventh effects can be produced, even when the ECU 40 does not correct the base value in accordance with the temperature of the air pump 34.

The first to fourth, sixth, and seventh effects can be produced, even when the ECU 40 does not correct the base value in accordance with the battery voltage.

The first to third, fifth to seventh effects can be produced, even when the ECU 40 does not correct the base value in accordance with the atmospheric pressure.

The base value is not limited to be calculated in accordance with the intake amount. The base value may be calculated in accordance with pressure in the exhaust passage, and a value, which is equivalent to the pressure in the exhaust passage.

The detection object in the upstream of the valves 32a, 32b in the secondary air supply passage 30, 30a, 30b is not limited to pressure detected using the pressure sensor 33. The secondary air amount in the secondary air supply passage may be at least one of the detection object.

The diagnosis operation may be performed by comparing a detection signal of a detection object, which is detected when the valve opens, with a threshold, which is corrected in accordance with the detection signal of the detection object detected when the valve closes, for example. The detection object is not limited to secondary air.

The engine having the two exhaust systems is not limited to the V-type engine. The engine may be a horizontally-opposed engine. The number of the exhaust systems is not limited to two. The above operation and structure may be applied to a structure, in which the secondary air amount is detected in the upstream of the merging point, in which secondary air supply passages merge, in multiple secondary air supply passages. In this structure, a detection signal of a detection object, when only one of the valves opens, and the detection signal of the detection object, when all the valves close, may be obtained, and a diagnosis operation may be performed in accordance with the detection signal of the detection object. In this case, the accuracy of the diagnosis operation can be enhanced in a manner that the diagnosis operation is determined to be valid by performing the detecting operation of the detection object, when only the valve opens, and the detecting operation of the detection object, when all the valves close, one after the other. The number of the secondary air supply passage may be one.

The reliability maintaining unit is not limited to the operations in steps S16, S18. For example, the operations in steps shown in FIGS. 5 to 7 may be sequentially performed, regardless of the result of the executing condition. Subsequently, the diagnostic operation shown in FIG. 8 may be performed in accordance with the result of the operations in FIGS. 5 to 7, so that the result of the diagnosis operation may be determined to be valid only when the executing conditions are satisfied during the operations in steps FIGS. 5 to 7.

The evaluation whether the detecting operations of pressure are continuously performed may be performed in the following manner. Specifically, it is evaluated, whether parameters, which may indirectly exert influence to the diagnosis operation, do not substantially vary in the sequential detecting operations of the pressure in the secondary air supply passage by opening at least one of the valves opens and closing all the valves, for example. The parameters include the atmospheric pressure, temperature of the air pump, exhaust pressure, the battery voltage, and the like. In addition, instead of this evaluation, it may be evaluated whether the operating conditions are substantially maintained excluding the operations of the valves during the detecting operations of the pressure in the secondary air supply passage.

The above operations and structures may be applied to an engine, which does not have a charging device such as a turbocharger. The structure of the engine may be modified, as appropriate.

The routine may proceed from step S10 to step S12, when all the executing conditions are satisfied. Alternatively, the routine may proceed from step S10 to step S12 when the executing conditions are at least partially satisfied. The executing conditions in step S10 described above are examples. The executing conditions may be modified. An additional executing condition may be included in the executing conditions in step S10, and at least one of the condition may be reduced from the executing conditions in step S10.

The order of the detecting operations of the pressure PsR, P0, and PsL are not limited to the order described in the above embodiment.

The above operations are not limited to be performed using the ECU 40. The above operation can be performed using any other processing unit, and the like.

Second Embodiment

Figure 9:
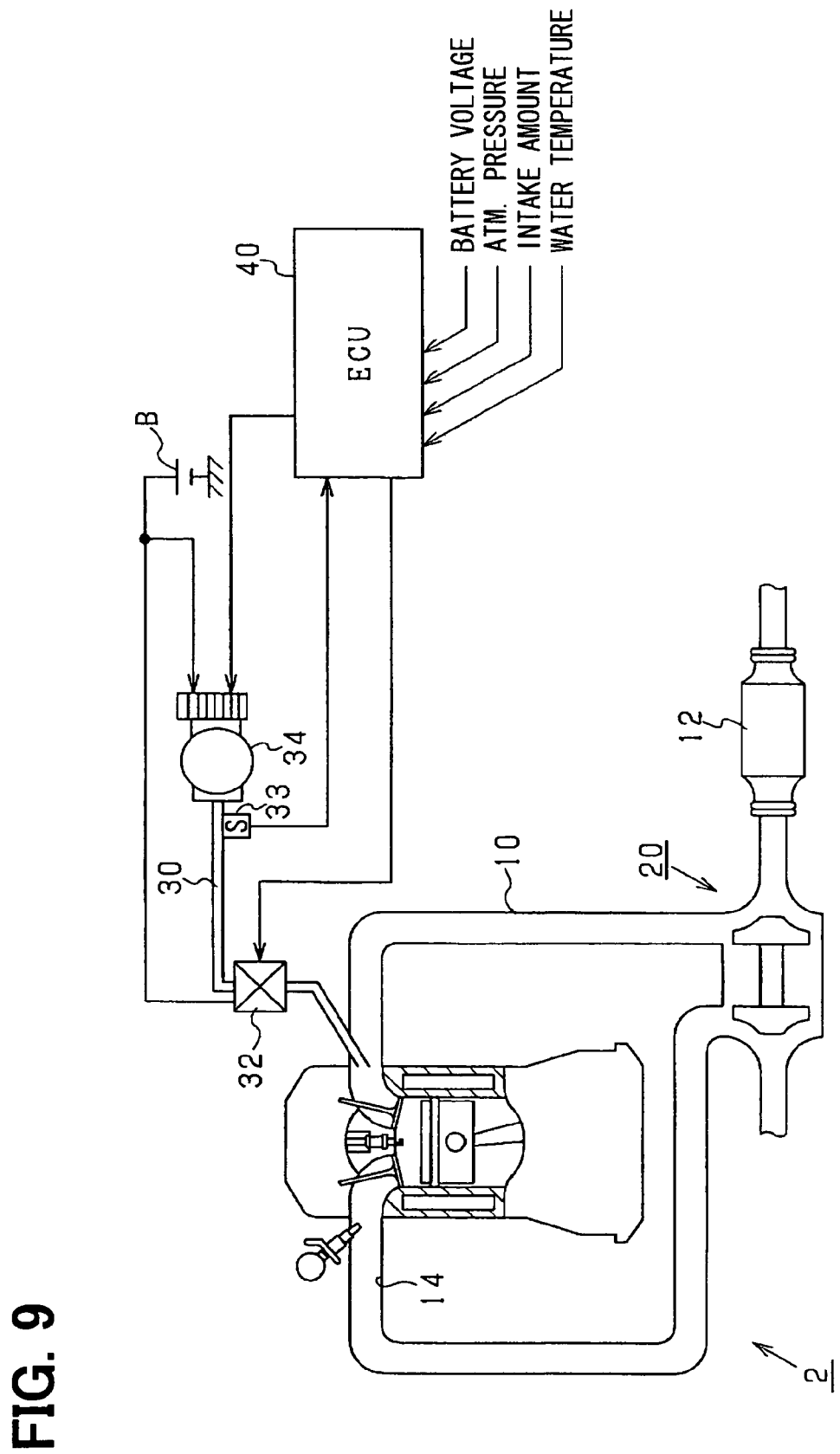
FIG. 9 is a schematic view showing a secondary air supply system for an internal combustion engine, according to a second embodiment of the present invention.

As shown in FIG. 9, the internal combustion engine 2 connects with the exhaust passage 10, which is provided with the exhaust gas purification apparatus 12. The exhaust passage 10 and an intake passage 14 interpose the turbocharger 20 therebetween.

The exhaust passage 10 connects with the secondary air supply passage 30 on the upstream side of the exhaust gas purification apparatus 12. Secondary air is supplied into the exhaust passage 10 through the secondary air supply passage 30. The secondary air supply passage 30 is provided with the valve 32 to communicate and block the secondary air supply passage 30. The secondary air supply passage 30 on the upstream side of the valve 32 is provided with the pressure sensor 33 for detecting pressure in the secondary air supply passage 30. The upstream of the secondary air supply passage 30 is provided with the air pump 34. The valve 32 and the air pump 34 are supplied with electricity from a battery B.

The ECU 40 is constructed of the central processing unit, the memory, and the like. The ECU 40 inputs various signals such as the detection signal of the pressure sensor 33, which detects pressure in the secondary air supply passage 30, voltage of the battery B, and the detection signals of atmospheric pressure, the amount of intake air, temperature (water temperature) of cooling water, and the like. The ECU 40 operates the valve 32 and the air pump 34, thereby controlling secondary air supplied into the exhaust passage 10.

Figure 10:
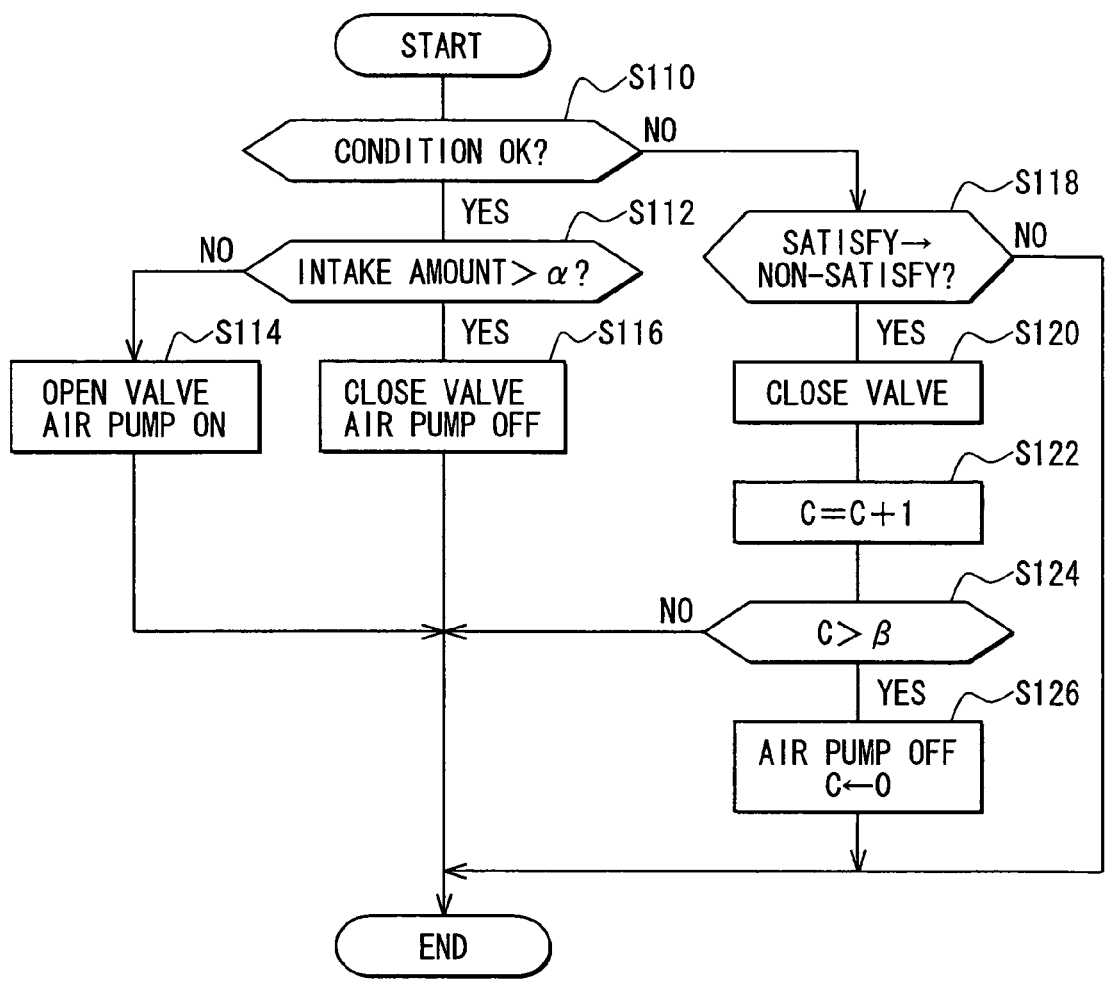
FIG. 10 is a flow chart showing a routine for the diagnosis operation of the secondary air supply system, according to the second embodiment.

As follows, a control operation of supplying secondary air is described in reference to FIG. 10. The control operation shown in FIG. 10 is repeatedly executed at predetermined intervals, for example.

In step S110, it is evaluated whether executing conditions of the control operation of supplying secondary air are satisfied. This condition may be satisfied when the water temperature is in a predetermined range in a starting condition of the engine 2, for example. When the executing conditions are determined to be satisfied in step S110, the routine proceeds to step S112, in which it is evaluated whether the amount (intake amount) of intake air is greater than a threshold $\alpha$. This threshold $\alpha$ is for evaluating a condition, in which pressure in the exhaust passage 10 becomes excessively large. When pressure in the exhaust passage 10 becomes excessively large, fluid may flow from the exhaust passage 10 into the secondary air supply passage 30. When the intake amount is determined to be equal to or less than the threshold $\alpha$ in step S112, the routine proceeds to step S114, in which the ECU 40 opens the valve 32, and turns the air pump 34 ON, thereby starting the control operation for supplying secondary air. By contrast, when the intake amount is determined to be greater than the threshold $\alpha$ in step S112, the routine proceeds to step S116, in which the ECU 40 closes the valve 32. This operation is for restricting fluid in the exhaust passage 10 from flowing into the secondary air supply passage 30, due to excessively high pressure in the exhaust passage 10. In this condition, the air pump 34 is operated.

When the executing conditions are not determined to be satisfied in step S110, the routine proceeds to step S118, in which it is evaluated whether a satisfying condition, in which the executing conditions are satisfied, changes to a non-satisfying condition, in which the executing conditions are not satisfied. That is, it is evaluated whether the executing conditions are satisfied on the previous control timing of the control operation shown in FIG. 10, and these executing conditions are not satisfied on the present control timing of the control operation. The previous control timing is before the present control timing for the predetermined interval. When the satisfying condition is determined to be changing to the non-satisfying condition in step S118, the routine proceeds to step S120, in which the ECU 40 closes the valve 32. In step S122, the ECU 40 increments a counter C by 1. In step S124, it is evaluated whether the counter C becomes greater than a threshold $\beta$. When the counter C is determined to be greater than the threshold $\beta$, the routine proceeds to step S126, in which the ECU 40 turns the air pump 34 OFF, and initializes the counter C at 0. The threshold $\beta$ in step S124 defines a delay time of the timing, in which the ECU 40 turns the air pump 34 OFF, with respect to the timing, in which the ECU 40 closes the valve 32.

The ECU 40 once terminates the control operation in the following three conditions. First, the satisfying condition is not determined to be changing to the non-satisfying condition in step S118. Second, the counter C is determined to be equal to or less than the threshold β in step S124. Third, the operations in steps S114, S116, S126 are completed.

The ECU 40 evaluates an abnormity in the secondary air supply system constructed of the secondary air supply passage 30, the valve 32, and the air pump 34. Specifically, in this example embodiment, the ECU 40 performs the diagnosis operation accompanied with the control operation (secondary air control operation) of supplying secondary air, as shown in FIG. 10. As follows, the diagnosis operation is described in detail.

Figure 11:
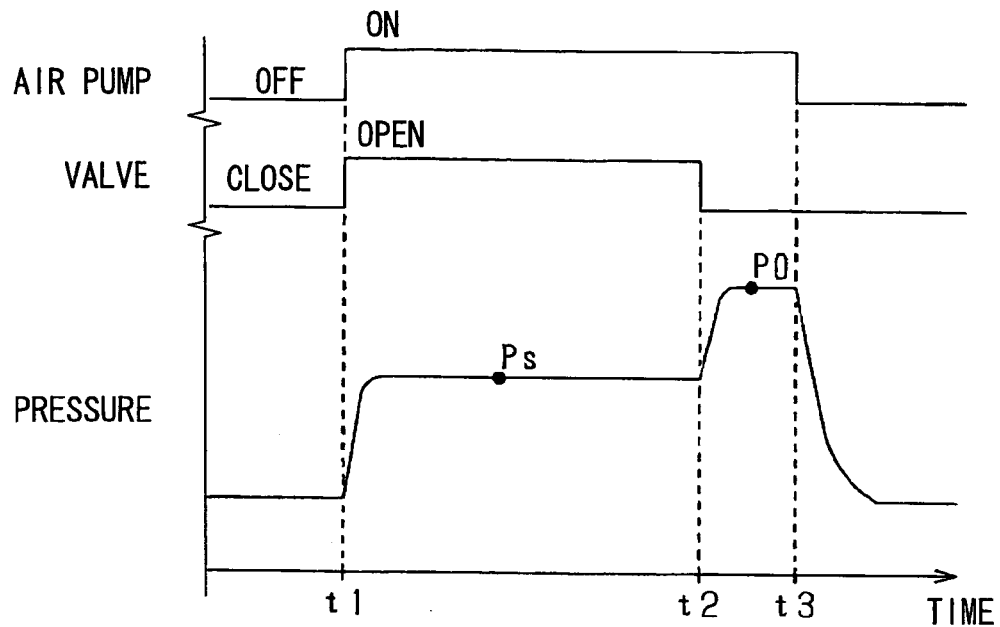
FIG. 11 is a time chart showing an example of the diagnosis operation of the secondary air supply system, according to the second embodiment.

According to an example shown in FIG. 11, on the timing t1, the executing conditions in step S110 shown in FIG. 10 are satisfied. In this condition, the ECU 40 turns the air pump 34 ON, and opens the valve 32 by the operation in step S114. On the timing t2, the satisfying condition changes to the non-satisfying condition. In this state, the executing conditions are not satisfied, and the ECU 40 closes the valve 32. On the timing t3, the ECU 40 stops the air pump 34 after elapsing the period corresponding to the threshold β from the timing t2.

In this example, the ECU 40 obtains the detection result of pressure Ps in the period between the timings t1 and t2, in which the ECU 40 operates the air pump 34 and opens the valve 32. Fluctuation may arise in pressure in the secondary air supply passage 30 due to starting the secondary air control operation. However, the detecting operation of the pressure Ps is performed on a timing, in which the fluctuation of pressure in the secondary air supply passage 30 is conceived to be small. The ECU 40 obtains the detection result of the pressure sensor 33 in this detecting operation. The ECU 40 further detects pressure P0 in the period between the timing t2, in which the valve 32 closes, and the timing t3, in which the air pump 34 stops. The detecting operation of the pressure P0 is performed on a timing, in which the fluctuation of pressure in the secondary air supply passage 30 is conceived to be small. The ECU 40 obtains the detection result of the pressure sensor 33 in this detecting operation.

The ECU 40 calculates the amount (secondary air amount) of secondary air, which is supplied into the exhaust passage 10 through the secondary air supply passage 30, in accordance with the pressure Ps, P0. Thus, the ECU 40 performs the diagnosis operation to evaluate an abnormity in the secondary air supply system, in accordance with the calculated secondary air amount.

Figure 12:
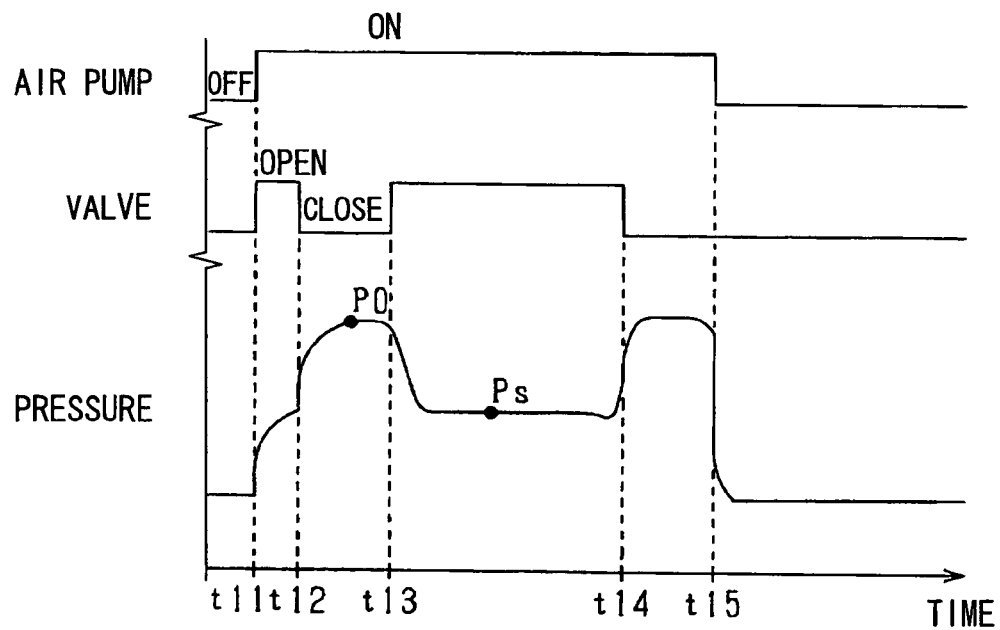
FIG. 12 is a time chart showing another example of the diagnosis operation of the secondary air supply system, according to the second embodiment.

According to an example shown in FIG. 12, on the timing t11, the executing conditions in step S110 shown in FIG. 10 are satisfied. In this state, the ECU 40 turns the air pump 34 ON, and opens the valve 32 by the operation in step S114. The ECU 40 closes the valve 32 in the period between the timings t12 and t13 by the operation in step S113. On the timing t14, the satisfying condition becomes non-satisfying condition, so that the ECU 40 closes the valve 32. On the timing t15, the ECU 40 stops the air pump 34 after elapsing the period corresponding to the threshold β.

In this example, the ECU 40 obtains the detection result of pressure P0 in the period between the timings t12 and t13, in which the ECU 40 operates the air pump 34 and closes the valve 32. Fluctuation may arise in pressure in the secondary air supply passage 30 due to closing the valve 32 on the timing t12. However, the detecting operation of the pressure P0 is performed on a timing, in which the fluctuation of pressure in the secondary air supply passage 30 is conceived to be small. In addition, the ECU 40 obtains the detection result of pressure Ps in the period between the timings t13 and t14, in which the ECU 40 operates the air pump 34 and opens the valve 32. Fluctuation may arise in pressure in the secondary air supply passage 30 due to opening the valve 32 on the timing t13. However, the detecting operation of the pressure Ps is performed on a timing, in which the fluctuation of pressure in the secondary air supply passage 30 is conceived to be small.

The ECU 40 do not detect pressure in the period between the timings t11 and t12, because it is difficult to secure a sufficient period, in which fluctuation of pressure in the secondary air supply passage 30 is conceived to be small. The ECU 40 calculates the secondary air amount, for which secondary air is supplied into the exhaust passage 10 through the secondary air supply passage 30, in accordance with pressure Ps, P0. Thus, the ECU 40 performs the diagnosis operation to evaluate an abnormity in the secondary air supply system, in accordance with the secondary air amount.

Next, the reason of using the pressure P0 for calculating the secondary air amount is described. Here, the pressure Ps is pressure in the secondary air supply passage 30, and the pressure Ps corresponds to the flow amount of secondary air supplied into the exhaust passage 10. Therefore, the flow amount of secondary air supplied into the exhaust passage 10 can be generally detected in accordance with only the pressure Ps. However, as the altitude of the vehicle changes, for example, the atmospheric pressure may vary. In this condition, as the atmosphere pressure changes, pressure in the secondary air supply passage 30 also change. Therefore, the flow amount of secondary air calculated on the basis of the pressure Ps may be affected by the detecting operation of the atmospheric pressure using the pressure sensor 33. Therefore, in this example embodiment, the pressure P0 is additionally taken into account in the calculation of the flow amount of secondary air, in order to reduce the effect, which is caused by detecting the atmospheric pressure using the pressure sensor 33.

In addition, the air pump 34 has a temperature characteristic. Specifically, when temperature (pump temperature) of the air pump 34 varies, the capacity of the air pump 34 also varies. Increase in the pump temperature is caused mainly due to increase in load applied to the air pump 34. In particular, exhaust pressure is apt increase in an internal combustion engine having a charging device. Accordingly, the pump temperature is apt to increase in an engine having a charging device. When the capacity of the air pump 34 varies, due to increase in the pump temperature, accuracy of the diagnosis operation of the secondary air supply system may be degraded. Specifically, a relative relationship between the flow rate of secondary air, which is calculated in accordance with the detection signal (detection result) of the pressure sensor 33, and the threshold for evaluating an abnormity in the secondary air supply system varies in the diagnosis operation, because of the temperature characteristic of the air pump 34. Therefore, when the threshold is set on the premise of that the capacity of the air pump 34 is constant regardless of the temperature characteristic of the air pump 34, the relative relationship of the detection signal and the threshold vary due to the temperature characteristic. In this case, the secondary air supply system may be determined to be abnormal, even though the secondary air supply system is in a normal condition.

Therefore, in this example embodiment, the ECU 40 obtains information of the pump temperature. Furthermore, the ECU 40 reduces variation in diagnosis results corresponding to the pump temperature from a relative relationship in the diagnosis results, in accordance with the information of the pump temperature, in order to accurately performing the diagnosis operation. As follows, the operation for obtaining the information of the pump temperature is described.

Figure 13A:
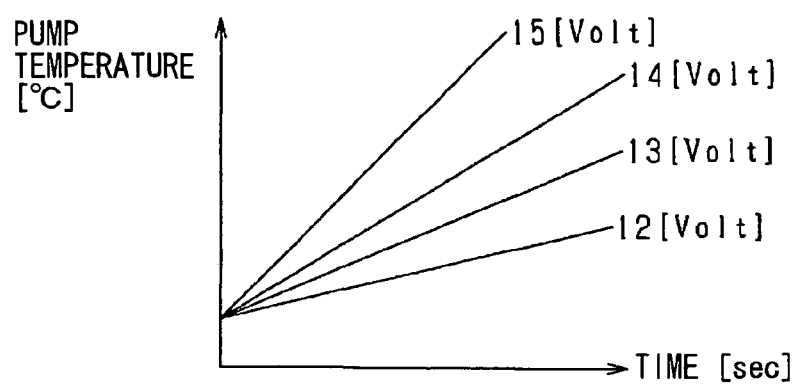
FIG. 13A is a graph showing a relationship between temperature of the air pump and voltage of a battery.
Figure 13B:
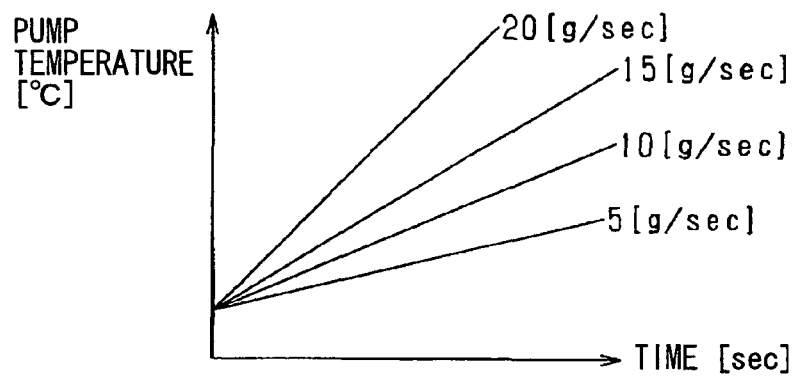
FIG. 13B is a graph showing a relationship between the temperature of the air pump and an amount of intake air, according to the second embodiment.

In this example embodiment, the ECU 40 calculates, i.e., estimates the pump temperature in accordance with the voltage (battery voltage) of the battery B and the intake amount. The pump temperature and the battery voltage have the relationship schematically depicted in FIG. 13A. The pump temperature and the intake amount have the relationship schematically depicted in FIG. 13B. As shown in FIG. 13A, the pump temperature is apt to increase, as the battery voltage becomes high. As shown in FIG. 13B, the pump temperature is apt to increase, as the intake amount becomes large. The intake amount has a correlation with respect to exhaust pressure. Exhaust pressure has a correlation with respect to load applied to the air pump 34.

Figure 14:
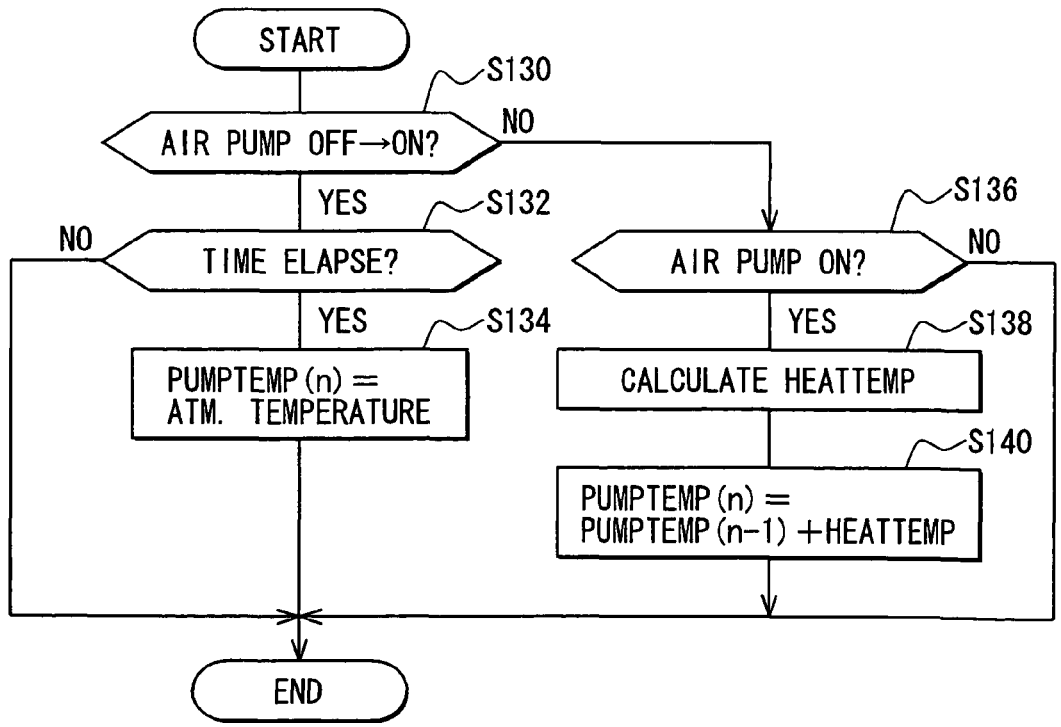
FIG. 14 is a flow chart showing a routine for calculating the temperature of the air pump, according to the second embodiment.

The ECU 40 executes the routine shown in FIG. 14 for calculating the pump temperature, repeatedly at regular intervals, for example.

In step S130, it is evaluated whether the present condition is immediately after turning the air pump 34 ON. Specifically, it is evaluated whether the air pump 34 is turned OFF on the previous control timing in the sequence of the routine shown in FIG. 14, and it is evaluated whether the air pump 34 is turned ON on the present control timing. When the ECU 40 determines the present condition to be immediately after turning the air pump 34 ON, the routine proceeds to step S132. In step S132, it is evaluated whether a predetermined time elapses from a previous stop timing, in which the air pump 34 in the operating state thereof is turned OFF, to the present start timing, in which the air pump 34 is turned ON. This evaluation is performed for determining a sufficient time to be elapsing for achieving a state of equilibrium thermally between the air pump 34 and the atmosphere around the air pump 34, after stopping the air pump 34.

When the ECU 40 determines the predetermined time to be elapsing in step S132, the routine proceeds to step S134, in which the ECU 40 substitutes the atmospheric temperature, which is obtained by the ECU 40, into the pump temperature PUMPTEMP(n) of the air pump 34. Thus, the ECU 40 sets the atmospheric temperature as an initial value of the pump temperature.

By contrast, when the ECU 40 does not determine the present condition to be immediately after turning the air pump 34 ON, the routine proceeds to step S136. In step S136, it is evaluated whether the air pump 34 is operated. When the air pump 34 is turned ON in step S136, the routine proceeds to step S138, in which the ECU 40 calculates a temperature variation HEATTEMP of the air pump 34 in accordance with a data map between the intake amount and the battery voltage. This data map is preliminarily defined in accordance with the relationships shown in FIG. 13A and FIG. 13B by experiment, for example. The temperature variation HEATTEMP is set to be large, as the battery voltage becomes high. In addition, the temperature variation HEATTEMP is set to be large, as the intake amount becomes large.

In step S140, the ECU 40 calculates the pump temperature PUMPTEMP (n) in the present control timing by adding the temperature variation HEATTEMP, which is calculated in step S138, to the pump temperature PUMPTEMP (n−1), which is calculated in the previous control timing.

The ECU 40 terminates the operations in one of a condition where the ECU 40 does not determine the predetermined time to be elapsing in step S132, a condition where the ECU 40 determines the air pump 34 to be stopping in step S136, and a condition where the ECU 40 completes the operations in steps S134, S140.

Figure 15:
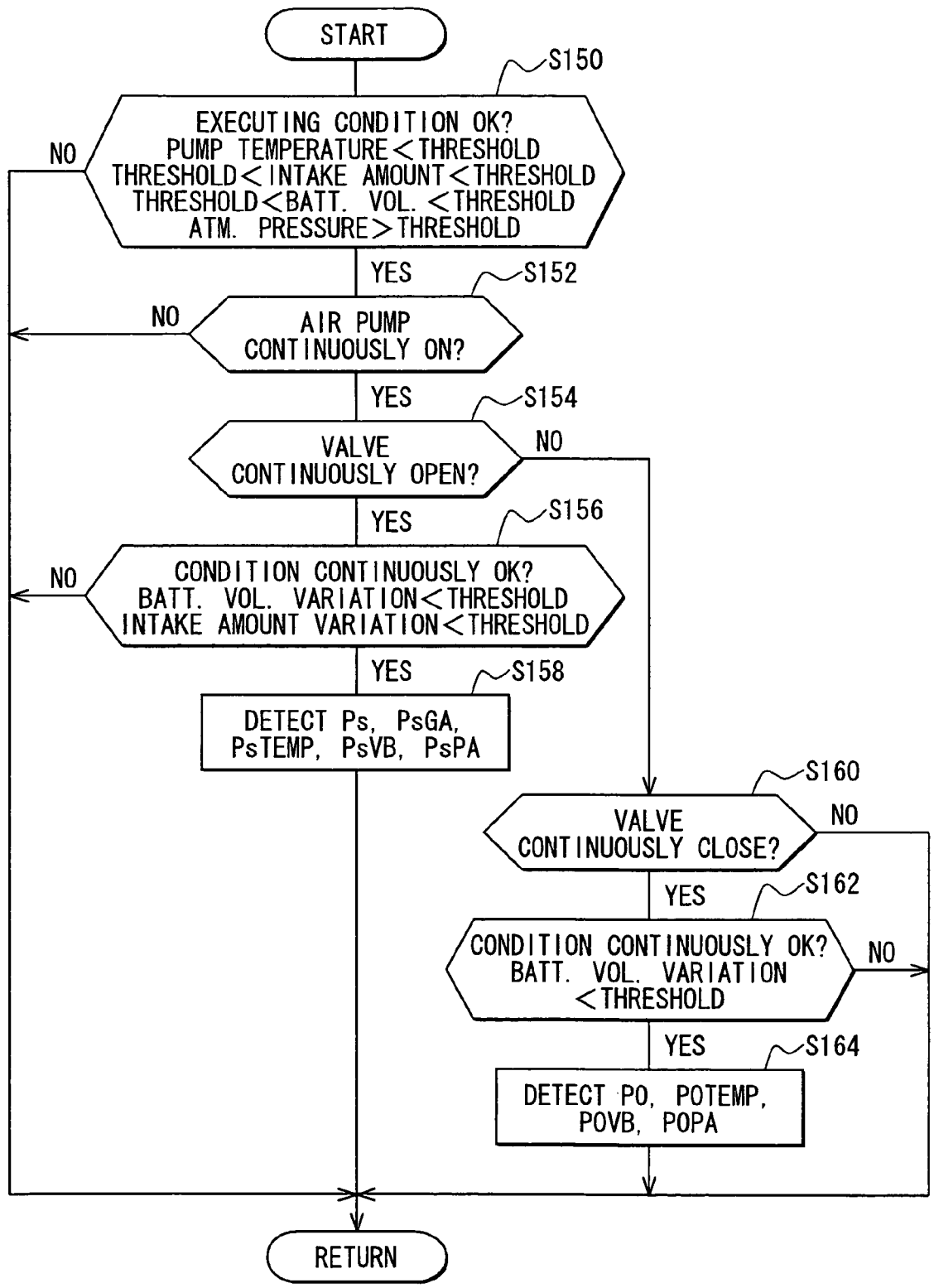
FIG. 15 is a flow chart showing a routine for detecting pressure, according to the second embodiment.

As follows, the operation for detecting pressure Ps, P0 is described. The ECU 40 executes the routine shown in FIG. 15 for detecting pressure Ps, P0, repeatedly at regular intervals, for example.

In step S150, it is evaluated whether executing conditions for detecting operation are satisfied. These executing conditions include the following four conditions.

First, the pump temperature is less than a threshold. As shown in FIG. 4, as the pump temperature becomes high, pressure of secondary air supplied from the air pump 34 decreases. Therefore, as the pump temperature becomes high, the pressure Ps, P0 depicted in FIG. 11 becomes low. In addition, in this condition, difference between pressure Ps and pressure P0 becomes small. Accordingly, when the pump temperature is excessively high, it becomes difficult to accurately detect the secondary air amount. Therefore, in this example embodiment, the threshold is set at a value, by which it can be evaluated whether the pump temperature is proper for securing the secondary air amount using the air pump 34.

Second, the intake amount is within a predetermined range. As the intake amount becomes large, pressure in the secondary air supply passage 30 increases when the valve 32 is opened. As the intake amount becomes large, exhaust pressure becomes high. When the intake amount is extremely large, for example, the difference between pressure Ps and pressure P0 becomes small. Accordingly, when the intake amount is extremely large, or extremely small, it becomes difficult to accurately calculate the secondary air amount. Therefore, in this example embodiment, the predetermined range is set at a range, in which the secondary air amount can be properly secured.

Third, the battery voltage is within a predetermined range. As referred to FIG. 4, as the battery voltage becomes high, pressure of secondary air supplied from the air pump 34 becomes high. By contrast, as the battery voltage becomes low, the discharge capacity of the air pump 34 decreases. When the battery voltage is extremely high, or is extremely low, the difference between pressure Ps and pressure P0 becomes small. Accordingly, when the battery voltage is extremely high, or is extremely low, it becomes difficult to accurately detect the flow amount of secondary air. Therefore, in this example embodiment, the predetermined range is set at a range, in which the flow amount of secondary air can be properly secured.

Fourth, the atmospheric pressure is higher than a predetermined threshold continuously for a predetermined period. As shown in FIG. 4, as the atmospheric pressure becomes high, pressure of secondary air supplied from the air pump 34 increases. Specifically, as the atmospheric pressure becomes high, atmosphere around the air pump 34 becomes dense, so that capacity of the air pump 34 for supplying secondary air is enhanced. By contrast, as the atmospheric pressure becomes low, the pressure Ps and P0 shown in FIG. 11 become low. In this condition, difference between pressure Ps and pressure P0 becomes small. Accordingly, when the atmospheric pressure is excessively low, it becomes difficult to accurately calculate the secondary air amount. Therefore, in this example embodiment, the threshold is set at a value, by which it can be evaluated whether the atmospheric pressure is sufficient for properly securing the secondary air amount.

When the executing conditions are determined to be satisfied in step S150, the routine proceeds to step S152, in which it is evaluated whether the operation of the air pump 34 is maintained continuously for a predetermined period. That is, it is evaluated whether the air pump 34 is turned ON continuously for the predetermined period. Here, the condition of being continuously for the predetermined period is defined for detecting the pressure Ps, P0 in a condition where the capacity of the air pump 34 becomes stable.

When the operation of the air pump 34 is maintained continuously for the predetermined period in step S152, the routine proceeds to step S154, in which it is evaluated whether the open condition of the valve 32 is maintained continuously for a predetermined period. That is, it is evaluated whether the valve 32 is opened continuously for a predetermined period. Here, this operation in step S154 is performed for evaluating a timing, in which fluctuation of pressure in the secondary air supply passage 30 caused by opening the valve 32 becomes sufficiently small.

When the ECU 40 determines the valve 32 to be opening for the predetermined period in step S154, the routine proceeds to step S156, in which it is evaluated whether the following two conditions are continuously satisfied.

First, variation in the battery voltage (battery voltage variation) is maintained to be equal to or less than a predetermined threshold continuously for a predetermined period. This condition is defined for performing the detecting operation in a condition where the battery voltage is stable. Specifically, when the battery voltage is not stable, the capacity of the air pump 34 varies. Therefore, the condition of the variation in the battery voltage is defined for performing the detecting operation in a condition where the capacity of the air pump 34 is stable.

Second, variation in the intake amount (intake amount variation) is maintained to be less than a predetermined threshold continuously for a predetermined period. This condition is defined for performing the detecting operation in a condition where the intake amount is stable. Specifically, when the intake amount is not stable, pressure in the secondary air supply passage 30 fluctuates. Therefore, the condition of the variation in the intake amount is defined for performing the detecting operation in a condition where the intake amount is stable.

When the variations in the battery voltage and the intake amount are maintained to be less than the corresponding predetermined thresholds continuously for the corresponding predetermined periods in step S156, the routine proceeds to step S158. In step S158, the ECU 40 obtains detection signals detected using various sensors, such as the pressure sensor 33, and the pump temperature PUMPTEMP (n) calculated by the operation in FIG. 14. Specifically, the ECU 40 obtains the pressure Ps in the secondary air supply passage 30, and further obtains the intake amount PsGA, the pump temperature PsTEMP, the battery voltage PsVB, the atmospheric pressure PsPA, and the like.

By contrast, when the ECU 40 does not determine the valve 32 to be opening for the predetermined period in step S154, the routine proceeds to step S160, in which it is evaluated whether the close condition of the valve 32 is maintained continuously for a predetermined period. That is, it is evaluated whether the valve 32 is closed continuously for the predetermined period. Here, this operation in step S160 is performed for evaluating a timing, in which fluctuation of pressure in the secondary air supply passage 30 caused by closing the valve 32 becomes sufficiently small.

When the ECU 40 determines the valve 32 to be closing continuously for the predetermined period in step S160, the routine proceeds to step S162, in which it is evaluated whether the following condition are satisfied.

Variation in the battery voltage is less than a predetermined threshold. This condition is defined for performing the detecting operation in a condition where the battery voltage is stable. Specifically, when the battery voltage is not stable, the capacity of the air pump 34 fluctuates. Therefore, the condition of the variation in the battery voltage is defined for performing the detecting operation in a condition where the capacity of the air pump 34 is stable.

When the valve 32 closes, pressure in the secondary air supply passage is not affected by exhaust pressure. Therefore, the condition for the intake amount is not defined in step S162, and the condition for the intake amount is defined in step S156, which corresponds to step S162.

When the ECU 40 determines the variation in the battery voltage to be less than the predetermined threshold in step S162, the routine proceeds to step S164. In step S164, the ECU 40 obtains detection signals detected using various sensors, such as the pressure sensor 33, and the pump temperature PUMPTEMP (n) calculated by the operation in FIG. 14. Specifically, the ECU 40 obtains the pressure P0 in the secondary air supply passage 30, and further obtains the pump temperature P0TEMP, the battery voltage P0VB, the atmospheric pressure P0PA, and the like.

The ECU 40 once terminates the operations in one of a condition where the ECU 40 does not determine the executing conditions in step S150 to be satisfied, a condition where the ECU 40 determines that the conditions are not maintained continuously for the predetermined period in steps S152, S156, S160, S162, and a condition where one of the detecting operations in steps S158, S164 is completed.

As follows, the operation for evaluating an abnormality in the secondary air supply system in accordance with the pressure Ps, P0 is described in reference to FIG. 16. The ECU 40 executes the routine shown in FIG. 16 for evaluating an abnormality, repeatedly at regular intervals, for example.

In step S170, it is evaluated whether the detecting operation of the pressure Ps is completed. In step S172, it is evaluated whether the detecting operation of the pressure P0 is completed. When the detecting operations of the pressure Ps, P0 are completed, the routine proceeds to step S174.

In step S174, it is evaluated whether absolute values of a pump temperature difference between the pump temperature PsTEMP, P0TEMP, a battery voltage difference between the battery voltage PsVB, P0VB, and an atmospheric pressure difference between the atmospheric pressure PsPA, P0PA are respectively less than corresponding thresholds. When at least one of these differences is excessively large, it is difficult to properly perform the diagnosis operation by correcting diagnosis values, e.g., thresholds, using these parameters. These thresholds are respectively set.

When the differences are respectively less than the corresponding thresholds in step S174, the routine proceeds to step S176. In step S176, the ECU 40 converts the pressure P0 to pressure P0', which represents pressure P0 supposed to be detected on the timing, in which the pressure Ps is detected. Specifically, the ECU 40 converts the pressure P0 to the pressure P0', which represents pressure P0 supposed to be detected under the pump temperature, the battery voltage, and the atmospheric pressure, which are in the state, in which the pressure Ps is detected. This operation is performed for correcting the detection value of the pressure P0, which changes in the time gap between the close condition of the valve 32 and the open condition of the valve 32. The detection value of the pressure P0 changes in this time gap due to variations in parameters, which indirectly exert influence on the pressure in the secondary air supply passage 30, excluding the operation of the valve 32.

Figure 17:
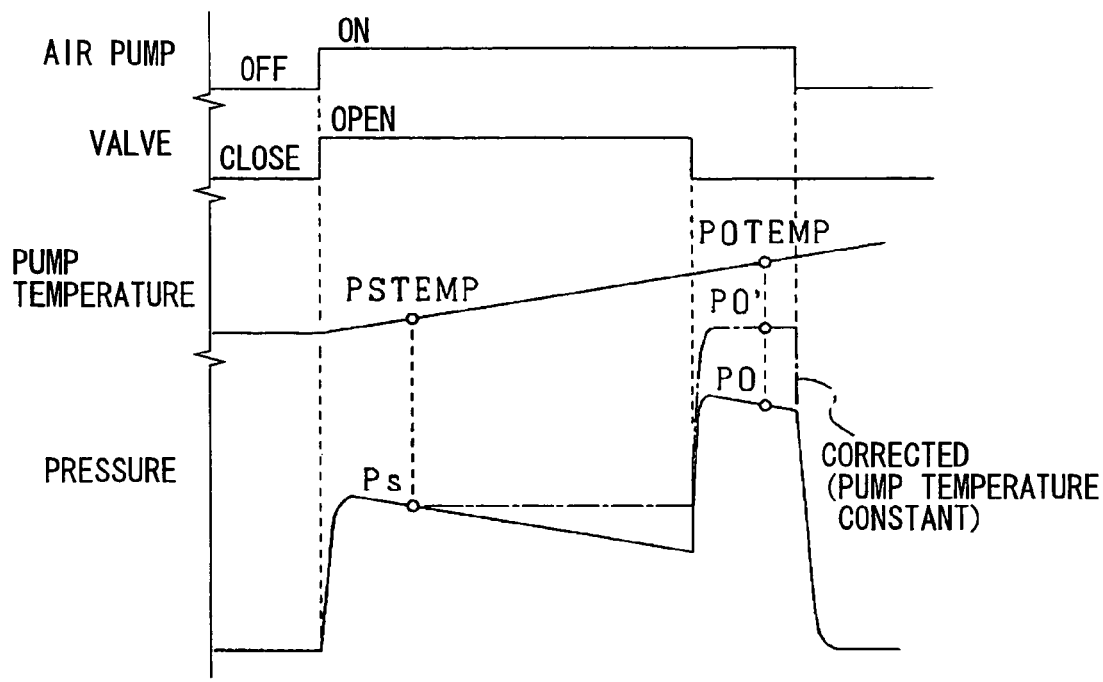
FIG. 17 is a time chart showing the diagnosis operation of the secondary air supply system, according to the second embodiment.
Figure 18:
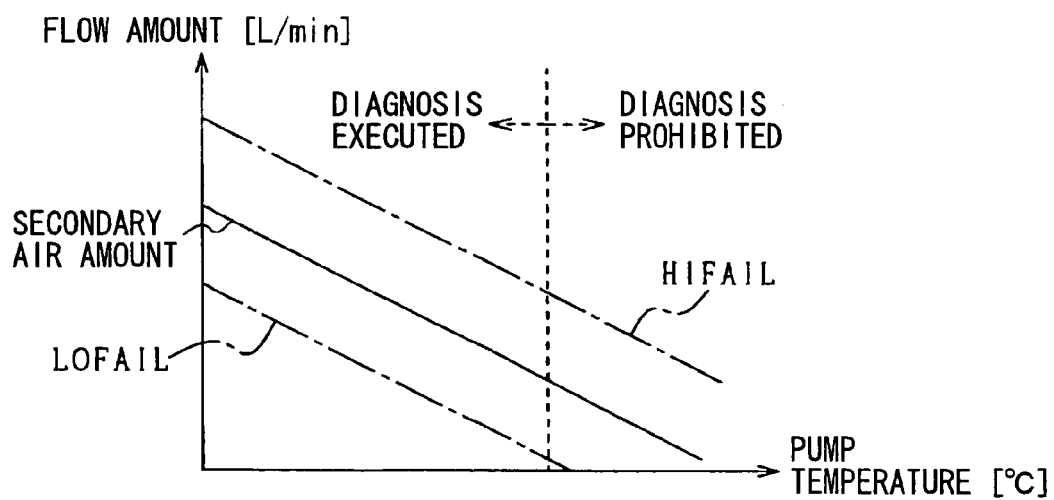
FIG. 18 is a graph showing a relationship between the temperature of the air pump and an amount of secondary air, according to the second embodiment.

In the trend of pressure shown in FIG. 17, the alternate long and short dash line indicates pressure when the pump temperature does not change. The pump temperature increases on the timing, in which the pressure P0 is detected, compared with the pump temperature on the timing, in which the pressure Ps is detected. Therefore, the pressure P0, which is actually detected, becomes lower than the pressure P0'. This pressure P0' is pressure in the supposed condition where the pump temperature does not change on the timing, in which the pressure P0 is detected.

In step S176, the ECU 40 calculates a pump temperature correction term in accordance with the pump temperature difference P0TEMP-PsTEMP. The pump temperature difference P0TEMP-PsTEMP is calculated by subtracting the pump temperature PsTEMP on the timing, in which the pressure Ps is detected, from the pump temperature P0TEMP on the timing, in which the pressure. P0 is detected. The ECU 40 calculates a battery voltage correction term, in accordance with the battery voltage difference P0VB-PsVB of the battery voltage. The battery voltage difference P0VB-PsVB is calculated by subtracting the battery voltage PsVB on the timing, in which the pressure Ps is detected, from the battery voltage P0VB on the timing, in which the pressure P0 is detected. The ECU 40 calculates an atmospheric pressure correction term, in accordance with the atmospheric pressure difference P0PA-PsPA of the atmospheric pressure. The atmospheric pressure difference P0PA-PsPA is calculated by subtracting the atmospheric pressure PsPA on the timing, in which the pressure Ps is detected, from the atmospheric pressure P0PA on the timing, in which the pressure P0 is detected.

The ECU 40 multiplies the pressure P0 by the pump temperature correction term, the battery voltage correction term, and the atmospheric pressure correction term to calculate the pressure P0'. This pressure P0' is the pressure in the supposed condition where the valve 32 is closed on the timing, in which the pressure Ps is detected.

In step S178, the ECU 40 calculates the secondary air amount SALFLOW in a condition where the valve 32 is opened. Specifically, the ECU 40 calculates the secondary air amount SALFLOW, when the valve 32 is opened, on the basis of a data map, in accordance with the pressure Ps and the pressure P0'. This data map may be defined on the basis of one of experimental data and the following equation.

$$SALFLOWL = CA\sqrt{\frac{2}{\rho}(P0' - Ps)} \quad (c1)$$

In this equation (c1), $\rho$ indicates the fluid density, C is a coefficient, and A indicates the cross sectional area of the secondary air supply passage 30.

In step S180 and the following steps, it is evaluated an abnormity in the secondary air supply system in accordance with whether the secondary air amount SALFLOW calculated in step S178 satisfies a criteria. Specifically, in step S180, the ECU 40 calculates abnormity thresholds LOFAIL, HIFAIL, which are for evaluating the secondary air amount SALFLOW. These abnormity thresholds LOFAIL, HIFAIL include a lower limit value LOFAIL and an upper limit value HIFAIL. The range between the lower limit value LOFAIL and the upper limit value HIFAIL defines the secondary air amount in the normal condition of the secondary air supply system. This range between the lower limit value LOFAIL and the upper limit value HIFAIL defines the criteria of the secondary air amount.

The ECU 40 calculates the lower limit value LOFAIL in accordance with the intake amount Ps, the pump temperature PsTEMP, the battery voltage PsVB, and the atmospheric pressure PsPA, in a condition where the valve 32 is opened. The intake amount has a correlation with respect to the exhaust pressure. The secondary air amount can be estimated in accordance with the exhaust pressure, in general, when the capacity of the air pump 34 and an operating condition such as the atmospheric pressure are substantially constant. In this example embodiment, the ECU 40 calculates a base value on the basis of the intake amount. The ECU 40 further calculates the pump temperature correction term in accordance with the pump temperature, in consideration of that the capacity of the air pump 34 varies corresponding to the temperature of the air pump 34. The ECU 40 further calculates the battery voltage correction term in accordance with the battery voltage, in consideration of that the capacity of the air pump 34 varies corresponding to the battery voltage. The ECU 40 further calculates the atmospheric pressure correction term in accordance with the atmospheric pressure in consideration of that the discharge pressure of the air pump 34 increases as the atmospheric pressure becomes high, because atmospheric density around the air pump 34 increases. The ECU 40 multiplies the base value by the pump temperature correction term, the battery voltage correction term, and the atmospheric pressure correction term, thereby calculating the lower limit value LOFAIL.

The ECU 40 calculates the upper limit value HIFAIL in accordance with the intake amount PsGA, the pump temperature PsTEMP, the battery voltage PsVB, and the atmospheric pressure PsPA, similarly to the calculation of the lower limit value LOFAIL.

Here, the ECU 40 calculates the secondary air amount in accordance with the pressure P0, i.e., P0' when the valve 32 is closed in step S178, in order to reduce an influence due to variation in pressure in the secondary air supply passage 30. This variation in the pressure in the secondary air supply passage 30 is caused by fluctuation in the atmospheric pressure during the calculation of the secondary air amount on the basis of the detecting operation of pressure using the pressure sensor 33. In step S180, the ECU 40 multiplies the atmospheric pressure correction term in consideration of the variation in the capacity of the air pump 34 because of variation in the air density corresponding to the atmospheric pressure. The above two atmospheric pressure correcting operations are different from each other.

The ECU 40 performs the operation of steps S182 to S192, after completing the operation of step S180. Specifically, in step S182, it is evaluated whether the secondary air amount SALFLOW is less than the lower limit value LOFAIL. When the secondary air amount SALFLOW is less than the lower limit value LOFAIL, the routine proceeds to step S184, in which the secondary air amount is determined to be decreasing when the valve 32 is opened, and the secondary air supply system is determined to be abnormal. By contrast, when the secondary air amount SALFLOW is equal to or greater than the lower limit value LOFAIL, the routine proceeds to step S186, in which the secondary air supply system is determined to be normal when the valve 32 is opened.

In step S188, it is evaluated whether the secondary air amount SALFLOW is greater than the upper limit value HIFAIL. When the secondary air amount SALFLOW is greater than the higher limit value HIFAIL, the routine proceeds to step S190, in which the secondary air amount is determined to be excessively increased when the valve 32 is opened, and the secondary air supply system is determined to be abnormal. By contrast, when the secondary air amount SALFLOW is equal to or less than the higher limit value HIFAIL in step S188, the routine proceeds to step S192, in which the secondary air supply system is determined to be normal when the valve 32 is opened.

Figure 16:
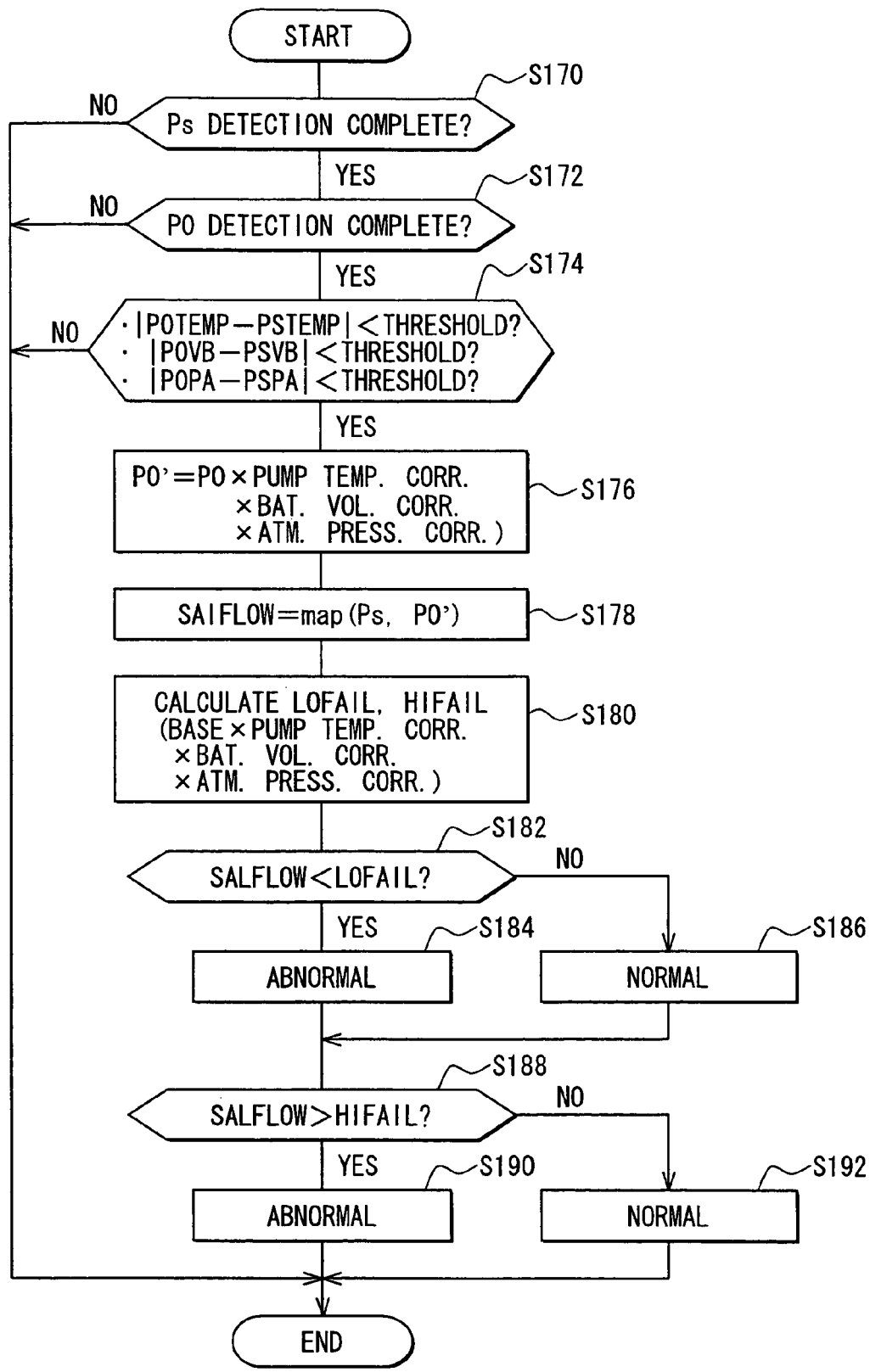
FIG. 16 is a flow chart showing a routine for the diagnosis operation of the secondary air supply system, according to the second embodiment.

The ECU 40 once terminates the operation shown in FIG. 16 in one of the following conditions. First, in steps S170, S172, it is determined that the detecting operations of the pressure Ps, P0 are not completed. Second, the differences are determined to be equal to or greater than the predetermined thresholds in step S174. Third, one of the operations in steps S190, S192 is completed.

In this example embodiment, the ECU 40 performs the operation in step S180 in order to reduce an influence due to a variation in the pump temperature from the correlation between the secondary air amount and the criterion for evaluating an abnormity. Therefore, when the secondary air supply system is in the normal condition, the correlation among the higher limit value HIFAIL, the lower limit value LOFAIL, and the secondary air amount, which is calculated, becomes substantially constant, even though the secondary amount, which is calculated, decreases as the pump temperature becomes high. That is, correlation among the diagnosis values, e.g., thresholds for the diagnosis operation becomes substantially constant. The secondary air supply system may be erroneously determined to be abnormal due to variation in the pump temperature, even when the secondary air supply system is in the normal condition. However, in this example embodiment, such an erroneous determination can be restricted from arising.

The diagnosis operation is prohibited in a diagnosis prohibited region, in which the pump temperature becomes high. This prohibiting operation is performed in step S150 in FIG. 15.

Next, effects of this embodiment are described.

The ECU 40 corrects the higher limit value HIFAIL and the lower limit value LOFAIL, as abnormity thresholds, in accordance with the pump temperature. Therefore, the ECU 40 is capable of performing the diagnosis operation in a condition where an influence due to a variation in the pump temperature is reduced from the correlation between the secondary air amount, which is calculated, and the criterion for evaluating an abnormity.

The ECU 40 calculates the pump temperature by the operations shown in FIG. 14, so that a sensor for detecting the pump temperature can be omitted.

The ECU 40 sets the atmospheric temperature as the initial value of the pump temperature in step S134, when the period between the previous stop of the air pump 34 and the present start of the air pump 34 becomes equal to or greater than the predetermined period in step S132. Therefore, the ECU 40 is capable of appropriately revising the initial value of the pump temperature.

The ECU 40 corrects the pressure P0, which is detected in the close condition of the valve 32, in accordance with the difference between the pump temperature, when the pressure Ps is detected, and the pump temperature, when the pressure P0 is detected, and the like. Therefore, the ECU 40 is capable of converting the pressure P0, which is detected when the valve 32 is closed, to the pressure P0', which is a supposed value, when the valve 32 is assumed to be closing in the detecting operation of the pressure Ps.

The ECU 40 permits the diagnosis operation when the difference, which is between the pump temperature in the detecting operation of the pressure Ps and the pump temperature in the detecting operation of the pressure P0, is less than the predetermined threshold in step S174. Therefore, the ECU 40 can be restricted from performing the diagnosis operation in the condition where it is difficult to accurately correcting the diagnosis values, e.g., thresholds for the diagnosis operation, based on the difference of the pump temperature, because of the difference of the pump temperature being excessively large.

The ECU 40 prohibits the diagnosis operation when the pump temperature is equal to or greater than the predetermined threshold. Therefore, accuracy of the diagnosis operation can be secured, even when it is difficult to properly perform the diagnosis operation, because of the secondary air mount being excessively small due to the pump temperature being excessively large.

Variation of the Second Embodiment

The first to sixth effects can be produced, even when the ECU 40 does not correct the base value in accordance with the battery voltage.

The first to sixth effects can be produced, even when the ECU 40 does not correct the base value in accordance with the atmospheric pressure.

The base value is not limited to be calculated in accordance with the intake amount. The base value may be calculated in accordance with pressure in the exhaust passage, and a value, which is equivalent to the pressure in the exhaust passage.

The second to sixth effects can be produced, even when the ECU 40 does not correct the base value in accordance with the pump temperature.

The detection object in the upstream of the valves 32a, 32b in the secondary air supply passage 30, 30a, 30b is not limited to pressure detected using the pressure sensor 33. The secondary air amount in the secondary air supply passage may be included in the detection object.

The detection object in the upstream of the valve 32 in the secondary air supply passage 30 is not limited to pressure detected using the pressure sensor 33. The detection object may be the secondary air amount in the secondary air supply passage 30, and the like. Furthermore, the detecting unit for detecting the detection object of secondary air is not limited a detecting unit that detects the detection object of secondary air in the upstream of the valve 32 in the secondary air supply passage 30. The detection object of secondary air may be an air-fuel ratio in the exhaust passage 10.

The secondary air amount may be calculated using the following equation on the basis of pressure Ps, in the secondary air supply passage 30 in the open condition of the valve 32, and exhaust pressure Pex.

$$SALFLOW = CA\sqrt{\frac{2}{\rho}(Ps - Pex)} \tag{c2}$$

In this equation (c2), $\rho$ indicates the fluid density, C is a coefficient, and A indicates the cross sectional area of the secondary air supply passage 30. Even in this operation, the ECU 40 is capable of correcting at least one of the diagnosis values, e.g., thresholds for the diagnosis operation, in order to reduce an influence, due to the variation in the pump temperature, from the correlation between the first diagnosis value (secondary air amount), which is calculated in accordance with the detection result of the pressure sensor 33, and the threshold, which is the second diagnosis value.

An abnormity can be evaluated by comparing the detection result of the detection object in the open condition of the valve 32 with a threshold, which is corrected in accordance with the detection result of the detection object in the close condition of the valve 32, for example. Even in this operation, the ECU 40 is capable of correcting at least one of the diagnosis values in order to reduce an influence due to the variation in the pump temperature from the correlation between the detection result of the detection object in the open condition of the valve 32, as the first diagnosis value, and the threshold, which is corrected as the second diagnosis value.

The first to third, fifth, and sixth effects can be produced, even when the ECU 40 does not correct the pressure P0 in accordance with the pump temperature on both timings when the pressure Ps, P0 are detected.

The first to fourth and sixth effects can be produced, even when the ECU 40 does not perform the operation to permit the diagnosis operation when the difference between the pump temperature on both timings when the pressure Ps, P0 are detected is less than the predetermined threshold.

The first to fifth effects can be produced, even when the ECU 40 does not perform the operation to prohibit the diagnosis operation in a condition where the pump temperature is equal to or greater than the predetermined threshold.

The calculating operation of the pump temperature is not limited to the above operation. The pump temperature may be calculated in accordance with at least one of the battery voltage and the load applied to the air pump 34.

The setting operation of the initial value of the pump temperature is not limited to the above operation. The initial value of the pump temperature may be set in accordance with temperature of cooling water of the engine 2.

A temperature sensor may be provided for detecting the pump temperature, instead of estimating the pump temperature.

The correcting operation in the diagnosis operation in accordance with the pump temperature is not limited to the above operation. Only the operation for prohibiting the diagnosis operation in accordance with the pump temperature may be performed.

The above operations and structures may be applied to an engine, which does not have a charging device such as a turbocharger. The structure of the engine may be modified, as appropriate.

The secondary air amount in the secondary air supply passage may be at least one of the detection object.

In the above operation, the ECU 40 corrects the diagnosis value in the diagnosis operation in accordance with the pump temperature.

In this operation, the diagnosis operation can be properly performed by correcting the diagnosis values, specifically, the first diagnosis value and the second diagnosis value in accordance with the pump temperature, in consideration of that the first diagnosis value varies corresponding to the pump temperature. The first diagnosis value is a parameter, which is set in accordance with the detection result. The second diagnosis value is the threshold, which is compared with the first diagnosis value. Thus, the diagnosis operation can be performed using the diagnosis values while influence caused by variation in the pump temperature is reduced from the correlation between the first diagnosis value and the second diagnosis value. The pump temperature may be calculated in accordance with the battery voltage, the load applied to the air pump, a period, in which the air pump is operated, and the atmospheric pressure.

The diagnosis operation is prohibited when the pump temperature is equal to or greater than the threshold. That is, the diagnosis operation may be validated only when the pump temperature is less than the threshold.

The routine may proceed from step S150 to step S152, when all the executing conditions are satisfied. Alternatively, the routine may proceed from step S150 to step S152 when the executing conditions are at least partially satisfied. The executing conditions in step S150 described above are examples. The executing conditions may be modified. An additional executing condition may be included in the executing conditions in step S150, and at least one of the condition may be reduced from the executing conditions in step S150.

The above operations are not limited to be performed using the ECU 40. The above operation can be performed using any other processing unit, and the like.

Third Embodiment

Figure 19:
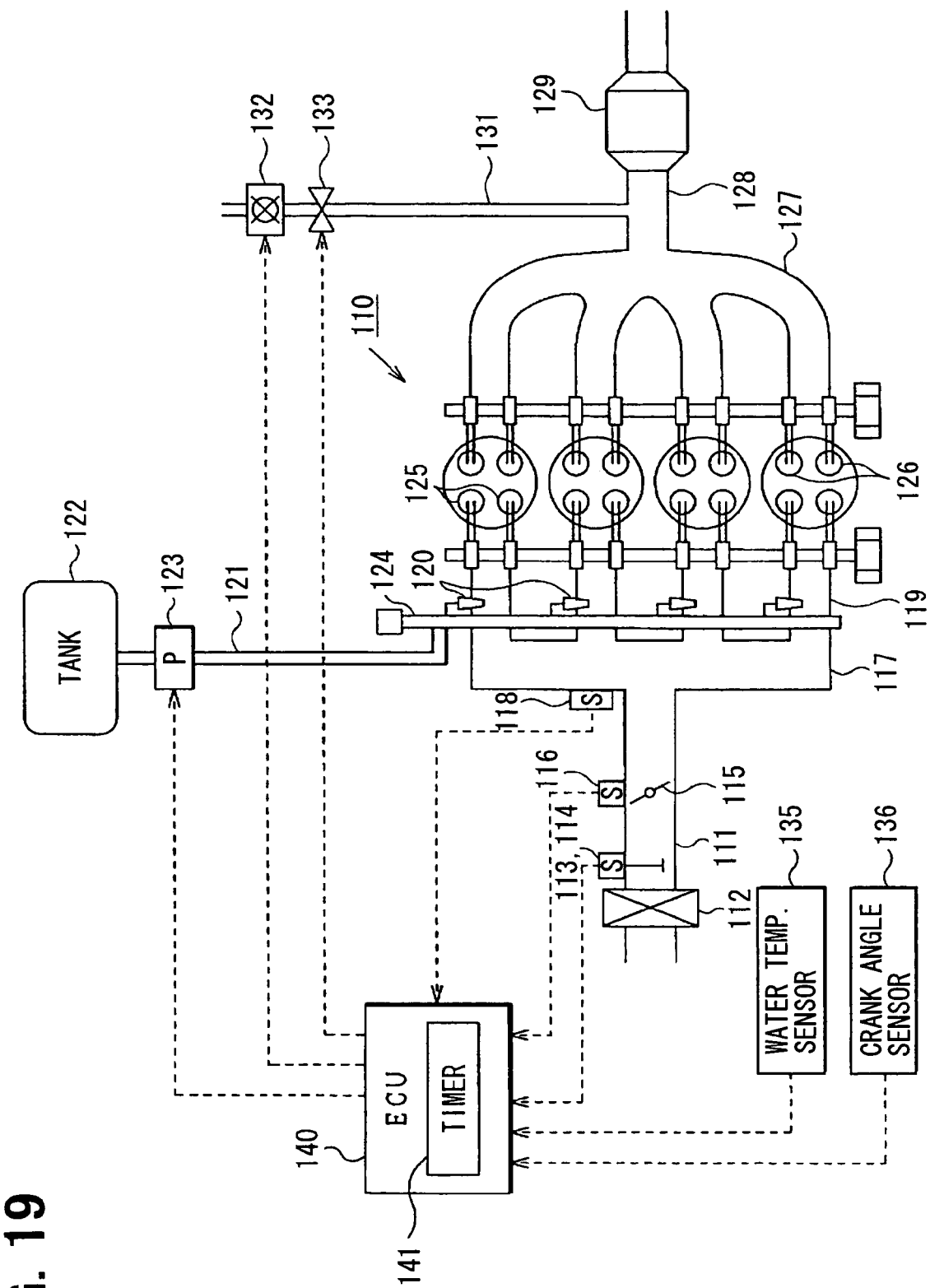
FIG. 19 is a schematic view showing a secondary air supply system for an internal combustion engine, according to a third embodiment of the present invention.

As shown in FIG. 19, an internal combustion engine 110 connects with an intake pipe 111. The uppermost stream of the intake pipe 111 is provided with an air cleaner 112. The downstream of the air cleaner 112 is provided with an air flow meter 113 for detecting an amount of intake air. The air flow meter 113 includes an intake temperature sensor 114 for detecting temperature of intake air. The downstream of the airflow meter 113 is provided with a throttle valve 115 and a throttle position sensor 116. The throttle valve 115 is operated using an actuator such as a DC motor. The throttle position sensor 116 detects opening angle (throttle position) of the throttle valve 115. The downstream of the throttle valve 115 is provided with a surge tank 117, to which an intake pressure sensor 118 is provided for detecting pressure in the intake pipe 111.

The surge tank 117 connects with an intake manifold 119 that introduces air into respective cylinders of the engine 110. The intake manifold 119 is provided with a fuel injection valve 120 in the vicinity of each intake port of each cylinder. The fuel injection valve 120 is operated using an actuator such as a solenoid actuator for injecting fuel. The fuel injection valve 120 is supplied with fuel from a fuel tank 122 through a fuel pump 123 and a delivery pipe 124 connected with a fuel pipe 121. The fuel injection valve 120 is supplied with electricity, so that fuel is injected into corresponding cylinder through the fuel injection valve 120.

The exhaust port and the intake port of the engine 110 are respectively provided with an intake valve 125 and an exhaust valve 126. The intake valve 125 opens, thereby introducing mixture gas formed of air and fuel into a combustion chamber of the engine 110. The exhaust valve 126 opens, thereby discharging exhaust gas, which is burned in the combustion chamber, into an exhaust manifold 127. The engine 110 has a cylinder head (not shown), to which ignition plugs are provided to respective cylinders. Each ignition plug is applied with high voltage, so that opposing electrodes of the ignition plug generate spark therebetween. Thus, mixture gas in the combustion chamber is ignited and burned. The downstream of the exhaust manifold 127 is provided with an exhaust pipe 128, to which a catalyst 129 is provided. The catalyst 129 is a three-way catalyst, for example, for purifying CO, HC, NOx, and the like contained in exhaust gas.

The upstream in the exhaust pipe 128 with respect to the catalyst 129 connects with a secondary air pipe 131. The upstream of the secondary air pipe 131 is provided with a secondary air pump 132. The secondary air pump 132 is constructed of a DC motor, for example. The secondary air pump 132 is supplied with electricity from a power source such as a vehicular battery (not shown). The downstream of the secondary air pump 132 is provided with a valve 133 for communicating and blocking the secondary air pipe 131. The secondary air pipe 131, the secondary air pump 132, and the valve 133 construct a secondary air supply apparatus.

This control system includes a water temperature sensor 135 and a crank angle sensor 136. The water temperature sensor 135 detects temperature of cooling water of the engine 110. The crank angle sensor 136 outputs rectangular crank angle signal at a predetermined crank angle such as 30° CA of the engine 110.

Output signals of the various sensors are input to an electronic control unit (ECU 140) that control the engine 110. The ECU 140 is mainly constructed of a microcomputer including a CPU, a ROM, a RAM, and the like. The ROM stores various control programs, which are executed to control the amount of fuel injection of the fuel injection valve 120 and the ignition timing of the ignition plug, in accordance with the operating condition of the engine 110. The ECU 140 operates the secondary air pump 132, thereby supplying secondary air for quickly activating the catalyst 129 after starting the engine 110. The amount of fuel injection is increased in accordance with the amount of secondary air when the secondary air is supplied into the engine 110.

The ECU 140 has a soak timer 141 for counting time elapsing after the engine 110 stops, thereby counting an engine stop period, in which the engine 10 stops. That is, the soak timer 141 counts during period, in which an ignition switch is turned OFF. Specifically, the soak timer 141 counts the engine stop period by being applied with backup voltage in the condition where the ignition switch is turned OFF.

The secondary air pipe 131, the secondary air pump 132, and the valve 133, which construct the secondary air supply apparatus, may be in a frozen condition, in which freeze is caused, in a cold region, cold weather, or the like. In this frozen condition, secondary air cannot be properly supplied. In this condition, over rich mixture gas may be formed, and the air fuel ratio may become excessively high due to increase in amount of fuel injection, which is added in consideration of supplying secondary air. Therefore, in this example embodiment, it is evaluated whether the secondary air supply apparatus is in the frozen condition, in accordance with temperature parameters and an engine stop period T_stop. The engine stop period T_stop is an elapsed time after the previous stop of the engine 110. The temperature parameters include temperature (intake air temperature Tin) of intake air, temperature (engine water temperature Tw) of cooling water of the engine 110, and the like. When the secondary air supply apparatus is determined to be in the frozen condition, the amount of fuel injection is restricted from increasing, so that mixture gas is restricted from being over rich due to increase in the amount of fuel injection. Thus, exhaust emission can be restricted from increasing due to over rich mixture gas.

The intake air temperature Tin is calculated based on the detection signal of the intake temperature sensor 114. The engine water temperature Tw is calculated based on the detection signal of the water temperature sensor 135. The engine stop period T_stop is calculated based on the count value of the soak timer 141.

As follows, a method for the evaluation of the frozen condition is described. In this example embodiment, the following two freeze conditions are evaluated in a starting operation of the engine 110, in which the ECU 140 is supplied with electricity, by turning the ignition switch ON. The first condition of the two freeze conditions is whether the intake air temperature Tin is less than a predetermined freeze evaluation threshold Ka. The second condition of the two freeze conditions is whether the engine water temperature Tw is less than a predetermined freeze evaluation threshold Kb. The intake air temperature Tin and engine water temperature Tw serve as temperature parameters, which correspond to temperature of components constructing the secondary air supply apparatus. The freeze evaluation thresholds Ka, Kb are set at low temperature values, in which the secondary air supply apparatus may be in the frozen condition. The freeze evaluation thresholds Ka, Kb are respectively set preferably between −20° C. and 0° C. More specifically, the freeze evaluation thresholds Ka, Kb are respectively set at −15° C., for example.

The secondary air supply apparatus may be instantaneously determined to be in the frozen condition when at least one of the two freeze conditions is satisfied. However, the secondary air supply apparatus may be in the frozen condition even both the two freeze conditions are not satisfied. Specifically, the following condition can be conceived. For example, the engine 110 is once started in a condition where the secondary air supply apparatus is in the frozen condition under an extremely low temperature environment, and subsequently, the engine 110 is stopped in the extremely low temperature environment, subsequently, the engine 110 is restarted immediately after stopping the engine 110. In this case, the engine 110 is one started, so that temperature in the engine room increases. Therefore, the intake air temperature Tin increases. However, in this condition, the secondary air supply apparatus is maintained to be in the frozen condition. For example, temperature (valve temperature) of the valve 133 is less than the intake air temperature Tin. Here, when the engine stop period, in which the engine 110 is stopped, is sufficiently long, the valve temperature becomes to be substantially equal to the intake air temperature Tin. Accordingly, it is difficult to correctly determine the secondary air supply apparatus to be in the frozen condition on the basis of only the intake air temperature Tin.

Therefore, when the engine stop period T_stop is less than a predetermined first threshold α, the secondary air supply apparatus is determined to be in the frozen condition. That is, when the engine stop period T_stop is relatively short, the secondary air supply apparatus is determined to be in the frozen condition, in order to reduce an error in determination of the frozen condition of the secondary air supply apparatus. By contrast, when the engine stop period T_stop is equal to or greater than the first threshold α, the secondary air supply apparatus is determined to be in a non-frozen condition, in which freeze is not caused in the secondary air supply apparatus, in general. The first threshold α is a predetermined period, which is preferably between 5 hours and 10 hours. More specifically, the first threshold α is a predetermined period such as 5 hours. The first threshold α is predetermined such that the intake air temperature substantially coincides with the valve temperature after elapsing the period equivalent to the first threshold α.

When the engine stop period T_stop is excessively short, it is conceived that the engine 110 is restarted immediately after the engine 110 is once stopped. In this case, it is less possible that new freeze arises in the secondary air supply apparatus, so that it can be conceived that one of the frozen condition and non-frozen condition of the secondary air supply apparatus is substantially maintained from the previous stop of the engine 110. Therefore, the previous determination result of the frozen condition can be adopted. Specifically, in the case where the secondary air supply apparatus is determined to be in the non-frozen condition in the previous determination when the engine stop period T_stop is less than a second threshold β, the previous determination can be adopted, so that the secondary air supply apparatus is determined to be in the non-frozen condition in the present determination.

The second threshold β is a predetermined period (freeze arising period), which is preferably between 15 minutes and 60 minutes. More specifically, the second threshold β is 30 minutes, for example. The second threshold β is predetermined such that the secondary air supply apparatus becomes to be in the frozen condition after elapsing the period equivalent to the second threshold β.

Figure 20:
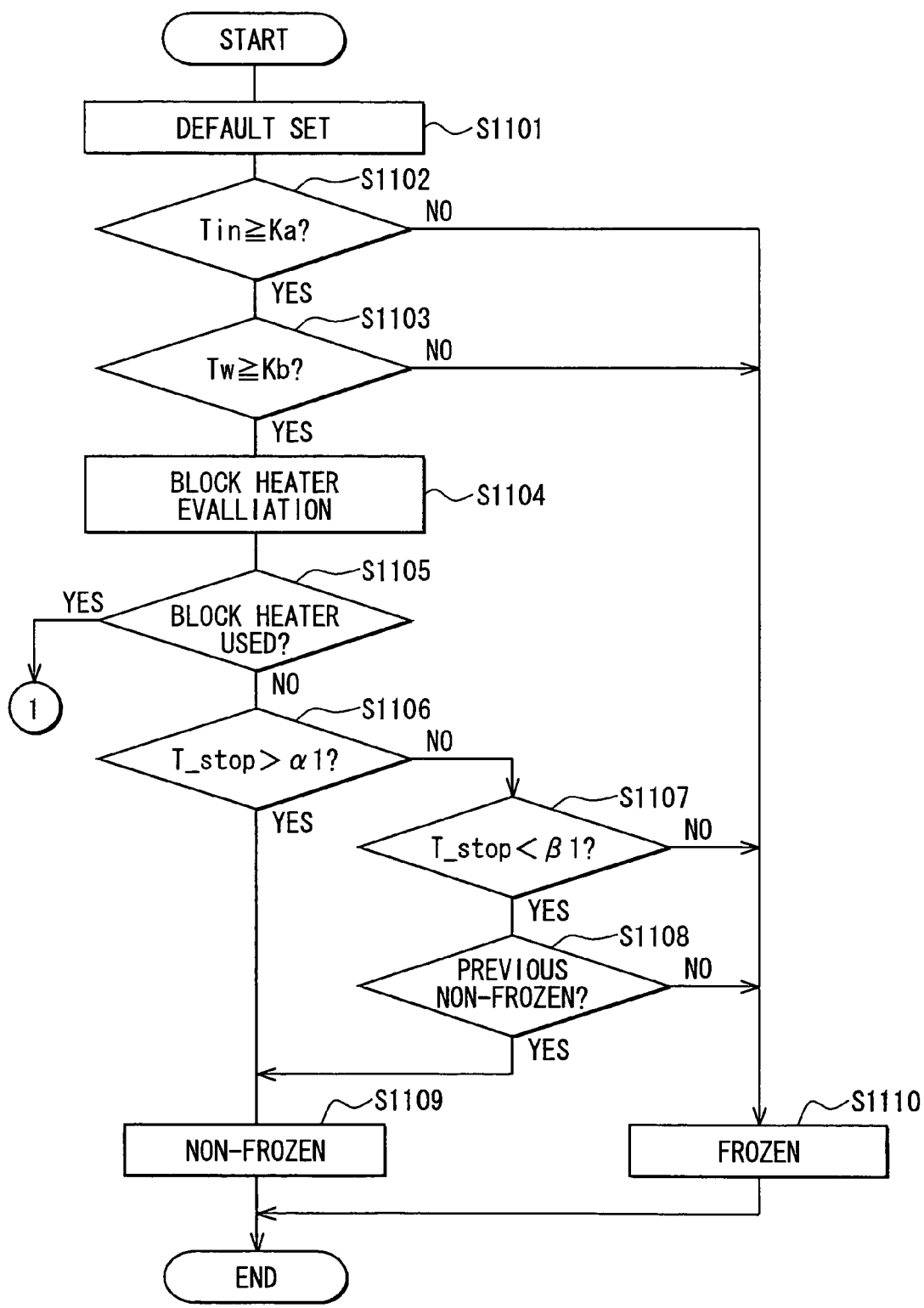
FIG. 20.
Figure 21:
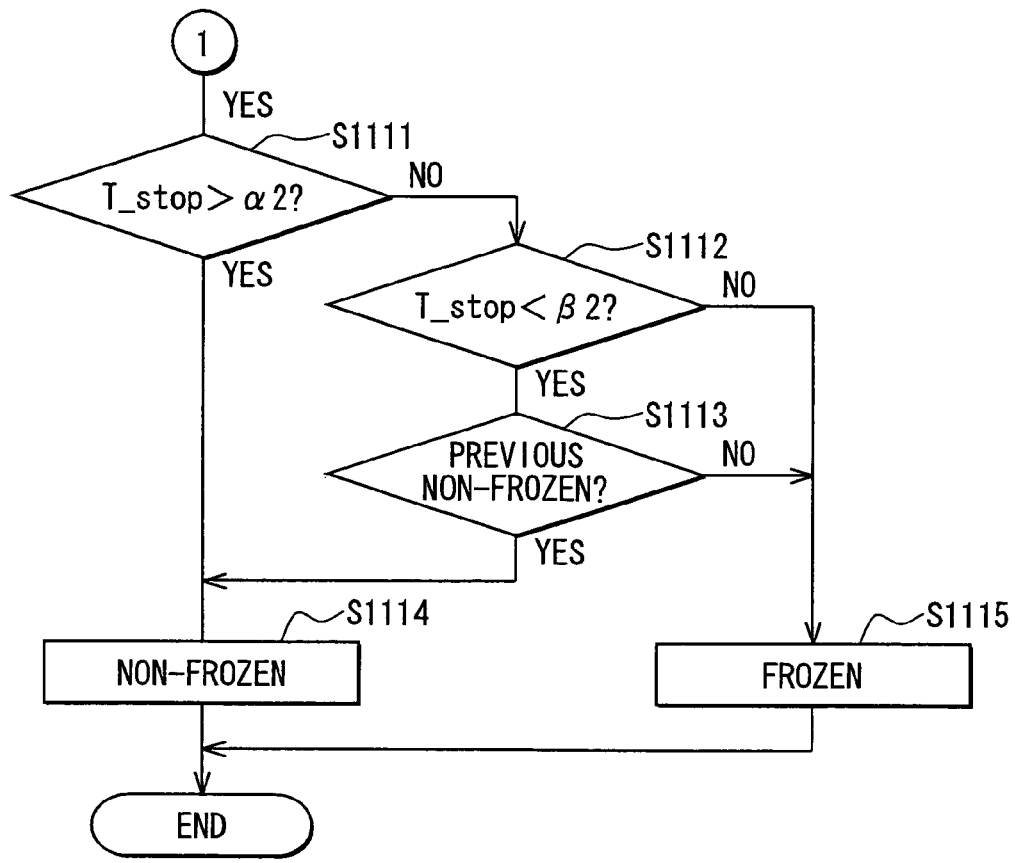
FIG. 21 are flow charts showing a routine for evaluating a frozen condition of the secondary air supply apparatus of the system, according to the third embodiment.

The routine shown in FIG. 20 and FIG. 21 is executed only once after the ignition switch is turned ON, so that the ECU 140 is supplied with electricity. In the following description, the first thresholds α1, α2 correspond to the first threshold α, and the second thresholds β1, β2 correspond to the second threshold β.

In step S1101, default values for the evaluation of the frozen condition are set. That is, determination results of the frozen condition are set as the default values.

Subsequently, it is evaluated whether the secondary air supply apparatus is in the frozen condition on the basis of the intake air temperature Tin and engine water temperature Tw. Specifically, in step S1102, it is evaluated whether the intake air temperature Tin is equal to or greater than a predetermined freeze threshold Ka such as −15° C. In step S1103, it is evaluated whether the engine water temperature Tw is equal to or greater than a predetermined freeze threshold Kb such as −15° C. When the intake air temperature Tin is less than the freeze threshold Ka, or when the engine water temperature Tw is less than the freeze threshold Kb, the routine proceeds to step S1110, in which the secondary air supply apparatus is determined to the in the frozen condition.

When the intake air temperature Tin is equal to or greater than the freeze threshold Ka in step S1102, and when the engine water temperature Tw is equal to or greater than the freeze threshold Kb in step S1103, the routine proceeds to step S1104, in which a block heater evaluation is performed. A block heater is provided to a vehicle climatized to cold regions for protecting engine cooling water from being frozen. The block heater may be provided to an engine block. The block heater is connected with an external power source, thereby generating heat to keep the engine 10 warm when the vehicle is stored in a storage space such as a garage in nighttime, for example. As a processing in step S1104, specifically it is evaluated whether the block heater is used before the present engine start, in accordance with temperature information and the engine stop period. The temperature information may include the engine water temperature Tw and the intake air temperature Tin in the previous engine stop. In addition, the temperature information may include the engine water temperature Tw and temperature of outside air in the present engine start.

When the block heater is not used, a negative determination is made in step S1105, so that the routine proceeds to step S1106. When the block heater is used, a positive determination is made in step S1105, so that the routine proceeds to step S1111.

In steps S1106 to S1110, it is evaluated whether the secondary air supply apparatus is in the frozen condition on the basis of the engine stop period T_stop. Specifically, in step S1106, it is evaluated whether the engine stop period T_stop is greater than the first threshold α1. When the engine stop period T_stop is greater than the first threshold α1, the routine proceeds to step S1109, in which the secondary air supply apparatus is determined to be in the non-frozen condition. The first threshold α1 is the predetermined period such as 5 hours.

When the engine stop period T_stop is equal to or less than the first threshold α1 in step S1106, the routine proceeds to step S1107. In step S1107, it is evaluated whether the engine stop period T_stop is less than the second threshold β1 such as 30 minutes. When the engine stop period T_stop is equal to or greater than the second threshold β1, the routine proceeds to step S1110, in which it is determined that the secondary air supply apparatus is in the frozen condition.

When the engine stop period T_stop is less than the second threshold β1 in step S1107, it is considered that the engine 110 is being restarted, so that the previous determination result of the freezing condition is adopted. In this case, in step S1108, it is evaluated whether the secondary air supply apparatus is determined to be in the non-frozen condition in the previous determination. When it is determined to be in the non-frozen condition in the previous determination, the routine proceeds to step S1109, in which the secondary air supply apparatus is determined to be in the non-frozen condition in the present determination, similarly to the previous determination.

When it is determined that the block heater is used in step S1105, the routine proceeds to step S1111. In the following processing, it is evaluated whether the secondary air supply apparatus is in the frozen condition on the basis of the engine stop period T_stop in steps S1111 to S1115, similarly to the steps S1106 to S1110. Specifically, in step S1μl, it is evaluated whether the engine stop period T_stop is greater than the first threshold α2. When the engine stop period T_stop is greater than the first threshold α2, the routine proceeds to step S1114, in which it is determined that the secondary air supply apparatus is in the non-frozen condition. Outside air temperature is generally low when the block heater is used, consequently, it is highly possible that the secondary air supply apparatus is in the frozen condition. The block heater is used for mainly heating the engine 10. Therefore, even when the block heater is used, the secondary air supply apparatus is not be heated by the block heater, in general. Therefore, the secondary air supply apparatus may be in the frozen condition, even when the block heater is used.

In this case, the first threshold α2 is preferably set to be greater than the first threshold α1, which is for the condition where the block heater is not used. Specifically, the first threshold α2 may be 10 hours, for example.

When the engine stop period T_stop is equal to or less than the first threshold α2, the routine proceeds to step S1112, in which it is evaluated whether the engine stop period T_stop is less than the second threshold β2 such as 30 minutes. When the engine stop period T_stop is equal to or greater than the second threshold β2, the routine proceeds to step S1115, in which the secondary air supply apparatus is determined to be in the frozen condition. When the block heater is used, outside air temperature is generally low, consequently, freeze may newly arise. Therefore, in this case, the second threshold β2 may be set to be less than the second threshold β1, which is used when the block heater is not used. Specifically, the second threshold β2 may be 15 minutes.

When the engine stop period T_stop is less than the second threshold β2, it is considered that the engine 110 is restarted, so that the previous determination result is adopted. In this condition, in step S1113, it is evaluated whether the previous determination result is the non-frozen condition. When the previous determination result is the non-frozen condition, the routine proceeds to step S1114, in which the secondary air supply apparatus is determined to be in the non-frozen condition, similarly to the previous determination.

When the secondary air supply apparatus is determined to be in the frozen condition in the previous determination, the routine proceeds to step S1115, in which the secondary air supply apparatus is determined to be in the frozen condition, similarly to the previous determination. Thus, the secondary air supply apparatus is prohibited from supplying secondary air, so that the amount of fuel injection is prohibited from increasing in consideration of supplying secondary air.

As follows, effects of this embodiment is described.

It is evaluated whether the secondary air supply apparatus is in the frozen condition on the basis of the temperature parameter, such as the intake air temperature Tin and engine water temperature Tw, obtained when the engine 110 is started. Therefore, the frozen condition can be evaluated instantaneously with the start of the engine 110. In this operation, pressure need not be monitored during the secondary air supply operation, so that the evaluation of the frozen condition need not take long. Furthermore, the secondary air pump 132 can be protected from being applied with excessive load. Thus, the evaluation of the freezing condition can be performed immediately after starting the engine 110, while protecting the secondary air supply apparatus.

A pressure sensor need not be provided for evaluating the frozen condition of the secondary air supply apparatus, so that manufacturing cost can be reduced. The temperature sensors for detecting the intake air temperature Tin and engine water temperature Tw are generally provided to an engine control system. Therefore, the structure of a diagnosis apparatus for evaluating the frozen condition may not be complicated, and production cost may not be increased due to use of these temperature sensors.

When the secondary air supply apparatus is determined to be in the frozen condition, the secondary air supply apparatus is prohibited from supplying secondary air, so that the secondary air pump 132 and the valve 133 can be protected from causing disorder due to operating the secondary air pump 132 and the valve 133 in the frozen condition.

When the secondary air supply pump is determined to be in the frozen condition, the amount of fuel injection, which corresponds to supplying secondary air, is prohibited from increasing. Therefore, fuel can be restricted from being excessively injected, so that mixture gas can be restricted from being over rich. Thus, exhaust emission can be restricted from increasing.

The frozen condition is evaluated in accordance with the engine stop period T_stop in a case where the intake air temperature Tin and engine water temperature Tw are relatively high. In this operation, the evaluation of the secondary air supply apparatus can be restricted from causing an error when the secondary air supply apparatus is actually frozen.

The previous determination result is adopted when the engine 110 is restarted, so that the secondary air supply apparatus can be restricted from being absolutely evaluated to be in the frozen condition in a case where the engine stop period T_stop is relatively short, that is, the engine stop period T_stop is less than the threshold α. Therefore, the frozen condition can be evaluated in accordance with the previous determination result.

The embodiment is not limited to the above description.

Figure 22:
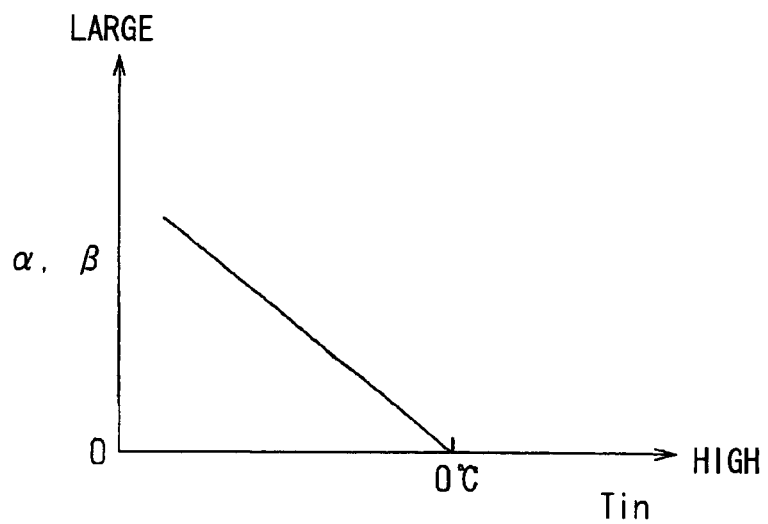
FIG. 22 is a graph showing a relationship between temperature of intake air and a threshold for the evaluation, according to the third embodiment.

At least one of the thresholds α, β for evaluating the engine stop period T_stop can be variably set in accordance with the intake air temperature Tin when the engine 110 is started. For example, at least one of the thresholds α, β are set on the basis of the relationship shown in FIG. 22. In this relationship, when the intake air temperature Tin is less than 0° C., at least one of the thresholds α, β are set to be large, as the intake air temperature Tin becomes low. By contrast, when the intake air temperature Tin is equal to or greater than 0° C., the at least one of the thresholds α, β is set at substantially 0. In this manner, the secondary air supply apparatus is not apt to be determined in the frozen condition in a condition where the intake air temperature Tin is relatively high when the engine 110 is started. Thus, accuracy of the evaluation of the secondary air supply apparatus can be enhanced. In addition, at least one of the thresholds α, β may be set small, as the intake air temperature Tin becomes high, when the engine 110 is started. In this manner, the secondary air supply apparatus may be frequently determined to be in the non-frozen condition, so that the number of supplying secondary air can be increased. Furthermore, in FIG. 22, the threshold level of the intake air Tin, at which at least one of the thresholds α, β is set at 0, may be determined at temperature, which is higher than 0° C.

Only the intake air temperature Tin may be used as the temperature parameter for evaluating the frozen condition.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A diagnosis apparatus for a secondary air supply system for an internal combustion engine having an exhaust passage, which connects with an exhaust gas purification apparatus, the secondary air supply system comprising:
   a secondary air supply passage that connects with the exhaust passage;
   an air pump for supplying secondary air to an upstream of the exhaust gas purification apparatus in the exhaust passage of the internal combustion engine through the secondary air supply passage; and
   a detecting unit for detecting a detection object of secondary air, the diagnosis apparatus comprising:
   a diagnosis unit for performing a diagnosis operation to evaluate an abnormity of the secondary air supply system in accordance with a detection result of the detecting unit;
   an obtaining unit for obtaining information of temperature of the air pump; and
   a changing unit for changing the diagnosis operation of the diagnosis unit in accordance with the information of the temperature of the air pump;
   the secondary air supply system further comprising:
   a battery for supplying electricity to the air pump;
   a voltage detecting unit for detecting voltage of the battery; and
   a load detecting unit for detecting load applied to the air pump,
   wherein the obtaining unit includes a calculating unit for calculating the temperature of the air pump in accordance with at least one of a detection result of the voltage detecting unit and a detection result of the load detecting unit,
   the calculating unit is adapted to setting an initial value of the temperature of the air pump,
   the calculating unit is adapted to calculating a variation in the temperature of the air pump in a period, which is between a previous timing of a calculation of the temperature of the air pump and a present timing of the calculation of the temperature of the air pump, in accordance with at least one of the voltage of the battery and the load applied to the air pump, after setting the initial value of the temperature of the air pump, and
   the calculating unit is adapted to calculating the temperature of the air pump by adding the variation to the temperature of the air pump, which is calculated on the previous timing of the calculation.

2. The diagnosis apparatus according to claim 1, wherein the changing unit is adapted to correcting a diagnosis value, which is used by the diagnosis unit in the diagnosis operation, in accordance with the temperature of the air pump.

3. The diagnosis apparatus according to claim 1, the secondary air supply system further comprising:
an atmospheric temperature detecting unit for detecting atmospheric temperature,
wherein the calculating unit includes an evaluating unit and a setting unit,
the evaluating unit evaluates whether a period between a previous timing, in which the air pump stops, and a present timing, in which the air pump starts, is equal to or greater than a threshold when the air pump is determined to be starting from a stop condition of the air pump, and
the setting unit sets the atmospheric temperature as an initial value of the temperature of the air pump, when the evaluating unit determines the period, which is between the previous timing and the present timing, to be equal to or greater than the threshold.

4. The diagnosis apparatus according to claim 1,
wherein the calculating unit sets the variation in the temperature of the air pump to be large, as the voltage of the battery becomes high, and
the calculating unit sets the variation in the temperature of the air pump to be large, as the load applied to the air pump becomes high.

5. The diagnosis apparatus according to claim 1, wherein the load detecting unit is adapted to detecting load, which is applied to the air pump, by detecting an amount of intake air of the internal combustion engine.

6. A diagnosis apparatus for a secondary air supply system for an internal combustion engine having an exhaust passage, which connects with an exhaust gas purification apparatus, the secondary air supply system comprising:
a secondary air supply passage that connects with the exhaust passage;
an air pump for supplying secondary air to an upstream of the exhaust gas purification apparatus in the exhaust passage of the internal combustion engine through the secondary air supply passage; and
a detecting unit for detecting a detection object of secondary air, the diagnosis apparatus comprising:
a diagnosis unit for performing a diagnosis operation to evaluate an abnonnity of the secondary air supply system in accordance with a detection result of the detecting unit;
an obtaining unit for obtaining information of temperature of the air pump; and
a changing unit for changing the diagnosis operation of the diagnosis unit in accordance with the information of the temperature of the air pump;
the secondary air supply system further comprising:
a valve for communicating the secondary air supply passage to be in an open condition and for blocking the secondary air supply passage to be in a close condition,
wherein the detecting unit is adapted to detecting the detection object of secondary air in an upstream of the valve in the secondary air supply passage,
the diagnosis unit is adapted to obtaining the detection result of the detecting unit in each of the open condition of the valve and the close condition of the valve for evaluating an abnormity of the secondary air supply system in accordance with the detection result, and
the changing unit is adapted to changing the diagnosis operation in accordance with the temperature of the air pump, when the detecting unit detects the detection object of secondary air in the open condition, and the temperature of the air pump, when the detecting unit detects the detection object of secondary air in the close condition.

7. The diagnosis apparatus according to claim 6,
wherein the diagnosis unit includes a flow amount calculating unit and an abnormity evaluating unit,
the flow amount calculating unit is adapted to calculating the flow amount of secondary air in accordance with the detection result of the detecting unit in each of the open condition and the close condition, and
the abnormity evaluating unit is adapted to evaluating an abnormity of the secondary air supply system in accordance with whether the flow amount of secondary air, which is calculated, satisfies a criterion.

8. The diagnosis apparatus according to claim 7,
wherein the changing unit is adapted to correcting the detection result of the detecting unit in the close condition in accordance with a difference between the temperature of the air pump, when the detecting unit detects the detection object of secondary air in the open condition, and the temperature of the air pump, when the detecting unit detects the detection object of secondary air in the close condition, and
the calculating unit is adapted to calculating the flow amount of secondary air in accordance with the detection result, which is corrected using the changing unit, and the detection result of the detecting unit in the open condition.

9. The diagnosis apparatus according to claim 7, wherein the diagnosis unit is adapted to calculating the criterion for the diagnosis operation in accordance with at least one of pressure in the exhaust passage and a value, which is equivalent to the pressure in the exhaust passage.

10. The diagnosis apparatus according to claim 9, wherein the changing unit is adapted to correcting the criterion in accordance with the temperature of the air pump.

11. The diagnosis apparatus according to claim 6, wherein the diagnosis unit permits the diagnosis operation when a difference between the temperature of the air pump, when the detecting unit detects the detection object of secondary air in the open condition, and the temperature of the air pump, when the detecting unit detects the detection object of secondary air in the close condition, is less than a threshold.

12. The diagnosis apparatus according to claim 1, wherein the changing unit validates the diagnosis operation of the diagnosis unit, only when the temperature of the air pump is less than a threshold.

13. The diagnosis apparatus according to claim 1, wherein the detecting unit is adapted to detecting the detection object of the secondary air by detecting pressure in the secondary air supply passage.

14. The diagnosis apparatus according to claim 6, wherein the changing unit is adapted to correcting a diagnosis value, which is used by the diagnosis unit in the diagnosis operation, in accordance with the temperature of the air pump.

15. The diagnosis apparatus according to claim 6, wherein the changing unit validates the diagnosis operation of the diagnosis unit, only when the temperature of the air pump is less than a threshold.

16. The diagnosis apparatus according to claim 6, wherein the detecting unit is adapted to detecting the detection object of the secondary air by detecting pressure in the secondary air supply passage.

* * * * *